United States Patent
Asahi et al.

(10) Patent No.: US 7,683,919 B2
(45) Date of Patent: Mar. 23, 2010

(54) GRADATION CONTROL DEVICE, OPTICAL DISPLAY DEVICE, GRADATION CONTROL PROGRAM, OPTICAL DISPLAY DEVICE CONTROL PROGRAM, METHOD OF CONTROLLING GRADATION AND METHOD OF CONTROLLING OPTICAL DISPLAY DEVICE

(75) Inventors: Tsunemori Asahi, Hotaka-machi (JP);
Junichi Nakamura, Shiojiri (JP);
Shoichi Uchiyama, Suwa-gun (JP);
Takashi Nitta, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1045 days.

(21) Appl. No.: 11/066,199

(22) Filed: Feb. 25, 2005

(65) Prior Publication Data
US 2005/0190140 A1  Sep. 1, 2005

(30) Foreign Application Priority Data

Mar. 1, 2004  (JP)  ............................... 2004-056175
Oct. 4, 2004  (JP)  ............................... 2004-291473

(51) Int. Cl.
*G09G 5/10* (2006.01)
*G09G 5/00* (2006.01)
*G06F 3/038* (2006.01)
(52) U.S. Cl. ............................. 345/690; 345/204; 345/4
(58) Field of Classification Search ................. 345/697, 345/84–85, 690–696, 200–204, 88–89, 98–100, 345/4, 5–6; 359/237, 223–226
See application file for complete search history.

(56) References Cited

U.S. PATENT DOCUMENTS

| | | | |
|---|---|---|---|
| 5,298,892 A * | 3/1994 | Shapiro et al. ................. | 345/88 |
| 5,657,036 A * | 8/1997 | Markandey et al. ........... | 345/85 |
| 6,057,816 A * | 5/2000 | Eckersley ...................... | 345/85 |
| 2002/0015016 A1* | 2/2002 | Kudo et al. .................... | 345/87 |

FOREIGN PATENT DOCUMENTS

| | | |
|---|---|---|
| JP | A-04-240689 | 8/1992 |
| JP | A-05-273506 | 10/1993 |
| JP | A-2001-281709 | 10/2001 |
| JP | A-2002-278501 | 9/2002 |
| JP | A-2002-297085 | 9/2002 |
| WO | WO 01/69941 A2 | 9/2001 |

OTHER PUBLICATIONS

Helge Seetzen et al., "54.2: A High Dynamic Range Display Using Low and High Resolution Modulators," SID 03 Digest, 2003.

* cited by examiner

Primary Examiner—Kevin M Nguyen
Assistant Examiner—Cory A Almeida
(74) Attorney, Agent, or Firm—Oliff & Berridge, PLC

(57) ABSTRACT

In a projection-type display device 1, a display control device 2 that controls a first DMD 50 and a second DMD 70 is composed by comprising an interface circuit 2a, a mirror device drive circuit 2b for controlling the driving of the micromirrors of second DMD 50, a mirror device drive circuit 2c for controlling the driving of the micromirrors of second DMD 70, a CPU 2d that controls computations and the entire system based on a control program, a ROM 2e that contains the control program of CPU 2d and so forth in a predefined area, and a RAM 2f for containing data read from ROM 2e and so forth and computation results required for the computation process of CPU 2d.

18 Claims, 11 Drawing Sheets

TIME

GRADATION CONTROL DEVICE, OPTICAL DISPLAY DEVICE, GRADATION CONTROL PROGRAM, OPTICAL DISPLAY DEVICE CONTROL PROGRAM, METHOD OF CONTROLLING GRADATION AND METHOD OF CONTROLLING OPTICAL DISPLAY DEVICE

BACKGROUND OF THE INVENTION

1. Field of the Invention

The present invention relates to a device, program and method that controls the gradation of an image by controlling the transmission state of light from a light source by means of a plurality of optical transmission elements optically arranged in series, and more particularly, to a gradation control device, gradation control program and method of controlling gradation preferable for realizing expansion of luminance dynamic range and number of gradations, along with an optical display device, optical display device control program and method of controlling an optical display device.

The present application claims priority from Japanese Patent Application No. 2004-056175 filed on Mar. 1, 2004 and Japanese Patent Application No. 2004-291473 filed on Oct. 4, 2004, the content of which are incorporated herein by reference.

2. Description of the Related Art

Dramatic improvements have been made in recent years in the image quality of liquid crystal displays (LCD), EL, plasma displays, cathode ray tubes (CRT), projectors and other optical display devices, and performance with respect to resolution and color gamut are nearly comparable to human vision characteristics. However, the reproduction range of luminance dynamic range is at best about 1 to $10^2$ nit, while the number of gradations is typically 8 bits. On the other hand, the luminance dynamic range that can be visualized all at once by human vision is about $10^{-2}$ to $10^{-4}$ nit, while luminance discrimination ability is about 0.2 nit, and when this is converted into a number of gradations, it is said to be equivalent to 12 bits. When considering the displayed images of current optical display devices in terms of these vision characteristics, the narrowness of the luminance dynamic range is conspicuous, and due to a lack of gradation of shadowed and highlighted areas, displayed images appear to lack realism and impact.

In addition, in the field of computer graphics (CG) used in movies and video games, there is a growing trend to pursue greater depiction reality by giving a luminance dynamic range and number of gradations that approach human vision to display data (referred to as high dynamic range (HDR) display data). However, due to the lack of performance of optical display devices that display that data, there is the problem in which CG images are unable to adequately demonstrate their inherent expressive capabilities.

Moreover, 16-bit color space is scheduled to be employed in next-generation operating systems (OS), resulting in a dramatic increase in the luminance dynamic range and number of gradations as compared with current 8-bit color space. Consequently, it is desirable to realize optical display devices capable of taking advantage of 16-bit color space.

Among optical display devices, liquid crystal projectors, digital light processing (DLP, trademark of the TI Corporation) and other projection-type display devices are capable of large-screen display, and are effective devices in terms of reproducing reality and impact of displayed images. In this field, the following proposals have been made to solve the aforementioned problems.

Technology for a high dynamic range projection-type display device is disclosed in, for example, Japanese Unexamined Patent Application, First Publication No. 2001-100689. This display device is provided with a light source, a first optical modulation element that modulates the luminance of the entire wavelength region of the light, and a second optical modulation element that modulates luminance of the wavelength region for each wavelength region of three primary colors of red, green and blue (RGB) within the wavelength region of the light. In this device, light from the light source forms a desired luminance distribution by modulating with the first optical modulation element, the optical image is then formed on the pixel surface of the second optical modulation element to modulate the color, after which the secondary modulated light is projected. Each pixel of the first optical modulation element and second optical modulation element is individually controlled based on a first control value and second control value, respectively, that are determined from HDR display data. The optical modulation elements have a pixel structure or segment structure that allows independent control of the transmission factor, and a transmission factor modulation element is used that is capable of controlling the two-dimensional distribution of transmission factor. A typical example of this is a liquid crystal light valve. In addition, a reflecting modulation element may be used instead of a transmitting modulation element, and a typical example of this is a digital micromirror device (DMD).

The following considers the case of using an optical modulation element having a dark display transmission factor of 0.2% and a bright display transmission factor of 60%. In the case of the optical modulation element alone, the luminance dynamic range is 60/0.2=300. Since the aforementioned projection-type display device of the prior art is equivalent to optically arranging optical modulation elements having a luminance dynamic range of 300 in series, a luminance dynamic range of 300×300=90,000 can be realized. In addition, since the same approach is valid for the number of gradations, a number of gradations in excess of 8 bits can be obtained by optically arranging optical modulation elements having a gradation of 8 bits in series.

However, in the case of using a DMD as an optical modulation element, since the optical transmission factor, reflection factor and so forth cannot be physically changed, it is necessary to make contrivances such as changing the apparent reflection factor by controlling the reflected direction (two directions) and continuation time of the light in a the micromirror that composes the DMD with the pulse width of a control signal (PWM control). In this manner, one method that has been considered in order to realize gradation display of images by controlling the two states of transmission and non-transmission of light in a specific direction consists of generating a plurality of control signals having different pulse widths respectively corresponding to the number of gradations of each pixel of an image in the manner of a field sequential system, and using time-shared control to control the cumulative transmission time of the light to a target location according to the generated control signals.

However, in the invention described in Patent Document 1, a concrete method for realizing expansion of the luminance dynamic range and number of gradations when using DMD for the first optical modulation element and second optical modulation element is not indicated.

In addition, when gradation display of an image is realized by controlling a first optical modulation element and second optical modulation element using a field sequential system as previously described, if the first optical modulation element and second optical modulation element are synchronously controlled, since gradation display of an image is only possible at the number of gradations that can be realized with only one of the modulation elements, the number of gradations cannot be expanded using simple synchronous control.

In addition, if liquid crystal light valves are used for the first optical modulation element and second optical modulation element, since the numerical aperture ends up being about 60% as a result of building in semiconductor components and so forth, the transmission factor during the bright state as previously described is 60%, thereby resulting in a decrease in light utilization efficiency. In other words, if liquid crystal light valves of the transmitting type having a numerical aperture of 60% are used for the first optical modulation element and second optical modulation element, the numerical aperture becomes 60%×60%=36%, thereby causing the optical transmission factor to decrease to 36%.

Therefore, in focusing on the aforementioned problems of the prior art that remain unsolved, the object of the present invention is to provide a gradation control device, gradation control program and method of controlling gradation, along with an optical display device, optical display device control program and a method of controlling an optical display device, that are preferable for realizing expansion of the luminance dynamic range and number of gradations of displayed images as well as improve the light utilization efficiency by controlling the transmission state and non-transmission state of light in a specific direction in an optical transmission element.

SUMMARY OF THE INVENTION

In order to achieve the aforementioned object, a gradation control device of the first invention is a device that is applied to an optical system that optically arranges in series two or more optical transmission elements having a plurality of optical transmission sections capable of independently controlling a transmission state and non-transmission state of incident light in a predetermined direction, and controls the transmission state and non-transmission state of the two or more optical transmission elements with a control signal; wherein, a signal delay unit is provided that is capable of delaying the timing by which the control signal is supplied to another optical transmission element by a predetermined amount of time beyond the timing by which the control signal is supplied to any one of the two or more optical transmission elements.

According to this constitution, the timing by which the control signal is supplied to another optical transmission element (to be referred to as a second optical transmission element) is delayed by a predetermined amount of time beyond the timing by which the control signal is supplied to any one of the two or more optical transmission elements (to be referred to as a first transmission element) by a signal delay unit.

Thus, by adjusting this delay time, light is able to be transmitted to a target location only during the time both the light transmission time of the first optical transmission element and light transmission time of the second optical transmission element overlap. In other words, the effect is obtained whereby the number of gradations that can be displayed can be expanded beyond the number of gradations that can be displayed by synchronous control of two or more optical transmission elements by more precisely controlling the transmission time of light to a target location by utilizing the time difference of a control signal that is supplied to two or more optical transmission elements as described above.

In addition, a comparatively high luminance dynamic range can be realized by using a high luminance light source.

In addition, since a gradation control device of the present invention need only be added to a known optical constitution that performs gradation display of images by controlling two or more optical transmission elements by synchronous control according to a control signal, it offers the effect of being able to realize precise gradation display without cost.

In addition, an optical transmission element is an element that is capable of controlling the two states of transmission and non-transmission of incident light in a specific direction by arranging a plurality of optical transmission sections capable of independently controlling the reflection and transmission of light in an incident plane and controlling these optical transmission sections in the manner of a DMD having a plurality of micromirrors capable of independently controlling each reflected direction of light (two directions) in an incident plane, or a liquid crystal light valve (for example, LCoS (Liquid Crystal on Silicon)) having a plurality of pixels capable of independently controlling the respective transmission factors of light in an incident plane. In other words, that which is able to control the transmission factor or reflection factor of light in another direction that has entered from one direction is also included in that which is able to control the two states of transmission and non-transmission of light in a specific direction. This applies similarly to the optical display device of the second invention described below.

On the other hand, in order to achieve the aforementioned object, an optical display device of the second invention displays an image by providing two or more optical transmission elements optically in series that have a plurality of optical transmission sections capable of independently controlling a transmission state and non-transmission state of incident light in a specific direction, and controlling the transmission state and non-transmission state of the light from a light source by means of the two or more optical transmission elements; comprising:

a control signal supply unit capable of generating a control signal that controls the transmission state and non-transmission state of the optical transmission elements based on the number of gradations of the displayed image, and supplying the generated control signal at a timing that is synchronized to each of the two or more optical transmission elements, and a signal delay unit capable of delaying the timing by which the control signal is supplied to another optical transmission element by a predetermined amount of time beyond the timing by which the control signal is supplied to any one of the two or more optical transmission elements.

According to this constitution, a control signal can be generated by a control signal supply unit that controls the transmission state and non-transmission state of the optical transmission elements based on the number of gradations of a displayed image, the generated control signal can be supplied at a timing that is synchronized to each of the two or more optical transmission elements, and the timing by which the control signal is supplied to another optical transmission element (to be referred to as a second optical transmission element) is delayed by a predetermined amount of time beyond the timing by which the control signal is supplied to any one of the two or more optical transmission elements (to be referred to as a first transmission element) by a signal delay unit.

Thus, by adjusting this delay time, light is able to be transmitted to a target location only during the time both the light transmission time of the first optical transmission element and light transmission time of the second optical transmission element overlap. In other words, the effect is obtained whereby the number of gradations that can be displayed can be expanded beyond the number of gradations that can be displayed by synchronous control of two or more optical transmission elements by more precisely controlling the transmission time of light to a target location by utilizing the time difference of a control signal that is supplied to two or more optical transmission elements as described above.

In addition, a comparatively high luminance dynamic range can be realized by using a high luminance light source.

In addition, any light source can be used for the light source provided it is a medium that emits light, and may be a light source contained in an optical system in the manner of a lamp, or that which uses external light in the manner of sunlight or an interior lamp.

Moreover, an optical display device of the third invention is an optical display device of the second invention, wherein the control signal supply unit generates a plurality of control signals based on the number of gradations of the displayed image, and the signal delay unit delays any one of the plurality of control signals by a predetermined amount of time based on the number of gradations.

According to this constitution, the control signal supply unit is able to generate a plurality of control signals based on the number of gradations of the displayed image, and the signal delay unit is able to delay any one of the plurality of control signals by a predetermined amount of time based on the number of gradations.

Thus, the effect is obtained whereby the number of gradations that can be displayed can be expanded by adjusting the aforementioned delay time for any one of the plurality of control signals.

Moreover, an optical display device of the fourth invention is the optical display device of the third invention, wherein the signal control supply unit generates a plurality of control signals based on the number of gradations of the displayed image, and the signal delay unit delays the timing by which any of the plurality of control signals is generated by a predetermined amount of time based on the number of gradations.

According to this constitution, the control signal supply unit is able to generate a plurality of control signals based on the number of gradations of the displayed image, and the signal delay unit is able to delay the timing by which any one of the plurality of control signals is generated by a predetermined amount of time based on the number of gradations.

Thus, the effect is obtained whereby the number of gradations that can be displayed can be expanded by adjusting the aforementioned delay time for any one of the plurality of control signals.

Moreover, an optical display device of the fifth invention is the optical display device of the third invention, wherein the duration of the transmission state is controlled according to the pulse width of the control signal.

According to this constitution, the transmission time of light in a specific direction can be easily controlled according to pulse width, and the effect is obtained whereby gradation display of an image can be carried out more accurately based on the number of gradations of a displayed image. In addition, the effect is also obtained by which time-shared control of gradation display of an image such as a field sequential system can be carried out easily.

Moreover, an optical display device of the sixth invention is the optical display device of the third invention, wherein the control signal supply unit is able to generate a pulse width control signal corresponding to each bit of a bit string that indicates the number of gradations based on the number of gradations of the displayed image, and is able to supply the generated control signal based on time-sharing and at a timing that is synchronized to each of the two or more optical transmission elements.

According to this constitution, a control signal can be supplied at a timing that is synchronized to each of two or more optical transmission elements and based on time-sharing. Thus, light can be transmitted by time-sharing to a target location for an amount of time equal to the difference between the light transmission time of an initial stage optical transmission element and the light transmission time of a latter stage optical transmission element by adjusting the aforementioned delay time for each control signal supplied based on time-sharing. As a result, the effect is obtained whereby the number of gradations that can be displayed can be expanded.

Moreover, an optical display device of the seventh invention is the optical display device of the third invention, wherein the control signal supply unit generates a specific pulse width control signal corresponding to a specific bit of the bit string that indicates the number of gradations; and, the signal delay unit calculates the delay time for the specific pulse width control signal based on the specific bit, and delays the timing by which the specific pulse width control signal is supplied to another optical transmission element beyond the timing by which the specific pulse width control signal is supplied to any one of the two or more optical transmission elements based on the calculated delay time.

According to this constitution, the control signal supply unit is able to generate a specific pulse width control signal corresponding to a specific bit of the bit string that indicates the number of gradations, and the signal delay unit is able to calculate the delay time for the specific pulse width control signal based on the specific bit, and delay the timing by which the specific pulse width control signal is supplied to another optical transmission element beyond the timing by which the specific pulse width control signal is supplied to any one of the two or more optical transmission elements based on the calculated delay time.

For example, in the case the number of gradations of a displayed image exceeds a predetermined number of gradations, a specific pulse width control signal corresponding to a bit that corresponds to the excess number of gradations in the form of a specific bit is generated by the control signal supply unit, and this is supplied to any one of the two or more optical transmission elements. On the other hand, the delay time for the specific pulse width control signal is calculated by the signal delay unit based on the specific bit, and the timing by which the specific pulse width control signal is supplied to another optical transmission element is delayed based on this calculated delay time.

Thus, the effect is obtained whereby the number of gradations that can be displayed can be expanded beyond the number of gradations that can be displayed by synchronous control of two or more optical transmission elements by more precisely controlling the transmission time of light to a target location by utilizing the time difference between specific pulse width control signals supplied to two or more optical transmission elements.

In addition, a comparatively high luminance dynamic range can be realized by using a high luminance light source.

Moreover, an optical display device of the eighth invention is the optical display device of the third invention, wherein the specific pulse width is equal to the pulse width of a control signal corresponding to the lowermost bit excluding the specific bit of the bit string that indicates the number of gradations.

According to this constitution, the effect is obtained whereby it becomes easier to calculate the delay time corresponding to the number of gradations of a displayed image, and the delayed supply of a control signal can be controlled easily.

Moreover, an optical display device of the ninth invention is the optical display device of the third invention, wherein the supply interval of the specific pulse width control signal is larger than the specific pulse width.

According to this constitution, since a control signal newly supplied to any one optical transmission element among two or more optical transmission elements, and the previous control signal supplied to another optical transmission element after being delayed, are prevented from overlapping, the effect is obtained whereby stable time-shared control of gradation display can be carried out.

Moreover, an optical display device of the tenth invention is the optical display device of the sixth invention, wherein in the case the number of specific bits is represented with n (where n is an integer), and the bit location of the specific bit in the bit string that indicates the number of gradations of the displayed image is represented with m (where m is an integer from 0 to (n−1)), then the signal delay unit calculates the amount of time obtained by multiplying the time of the specific pulse width by a coefficient obtained according to $(2^n - 2^m)/2^n$ as the delay time of the specific pulse width control signal.

According to this constitution, since the delay time of a specific pulse width control signal can be calculated easily according to the aforementioned formula, the effects is obtained by which a circuit or program and so forth for determining delay time can be generated easily.

Moreover, an optical display device of the eleventh invention is the optical display device of the seventh invention, wherein the number of optical transmission sections in the two or more optical transmission elements is the same for each optical transmission element.

According to this constitution, since the respective number of optical transmission sections of the two or more optical transmission elements is composed to be the same, the effect is obtained whereby gradations can be expressed accurately in pixel units of a displayed image, thereby making it possible to realize high-contrast image display.

Moreover, an optical display device of the twelfth invention is the optical display device of the second invention, wherein the two or more optical transmission elements are reflecting optical transmission elements.

According to this constitution, if reflective optical transmission elements such as DMD or reflecting liquid crystal light valves are used for the two or more optical transmission elements, the effect is obtained whereby light can be transmitted in a specific direction with hardly any loss in each optical transmission element, thereby making it possible to improve light utilization efficiency.

On the other hand, in order to achieve the aforementioned object, a gradation control program of the thirteenth invention is a program applied to an optical system that arranges two or more optical transmission elements optically in series that have a plurality of optical transmission sections capable of independently controlling a transmission state and non-transmission state of incident light in a specific direction, and controls the transmission state and non-transmission state of the two or more optical transmission elements with a control signal; wherein, processing, which is realized in the form of a signal delay unit capable of delaying the timing by which the control signal is supplied to another optical transmission element by a predetermined amount of time beyond the timing by which the control signal is supplied to any one of the two or more optical transmission elements, is made to be executed by a computer.

Here, since the present invention is a program for controlling a gradation control device of the first invention and its effects are the same, a description of those effects is omitted.

On the other hand, in order to achieve the aforementioned object, an optical display device control program of the fourteenth invention is a program for controlling an optical display device that displays an image by arranging two or more optical transmission elements optically in series that have a plurality of optical transmission sections capable of independently controlling a transmission state and non-transmission state of incident light in a specific direction, and controlling the transmission state and non-transmission state of the light from a light source by means of the two or more optical transmission elements; wherein, processing is made to be executed by a computer that is realized in the form of a control signal supply unit that generates a control signal that controls the transmission state and non-transmission state of the optical transmission elements based on the number of gradations of a displayed image, and supplies the generated control signal at a timing that is synchronized to each of the two or more optical transmission elements, and a signal delay unit capable of delaying the timing by which the control signal is supplied to another optical transmission element by a predetermined amount of time beyond the timing by which the control signal is supplied to any one of the two or more optical transmission elements.

Here, since the present invention is a program for controlling an optical display device of the second invention and its effects are the same, a description of those effects is omitted.

Moreover, an optical display device control program of the fifteenth invention is the optical display device control program of the fourteenth invention, wherein the control signal supply unit generates a plurality of control signals based on the number of gradations of the displayed image, and the signal delay unit delays any one of the plurality of control signals by a predetermined amount of time based on the number of gradations.

Here, since the present invention is a program for controlling an optical display device of the third invention and its effects are the same, a description of those effects is omitted.

Moreover, an optical display device control program of the sixteenth invention is the optical display device control program of the fourteenth invention, wherein the signal control supply unit generates a plurality of control signals based on the number of gradations of the displayed image, and the signal delay unit delays the timing by which any of the plurality of control signals is generated by a predetermined amount of time based on the number of gradations.

Here, since the present invention is a program for controlling an optical display device of the fourth invention and its effects are the same, a description of those effects is omitted.

Moreover, an optical display device control program of the seventeenth invention is the optical display device control program of any of the twelfth through fourteenth inventions, wherein the duration of the transmission state is controlled according to the pulse width of the control signal.

Here, since the present invention is a program for controlling an optical display device of the fifth invention and its effects are the same, a description of those effects is omitted.

Moreover, an optical display device control program of the eighteenth invention is the optical display device control program of the seventeenth invention, wherein the control signal supply unit is able to generate a pulse width control signal corresponding to each bit of a bit string that indicates the number of gradations based on the number of gradations of the displayed image, and is able to supply the generated control signal based on time-sharing and at a timing that is synchronized to each of the two or more optical transmission elements.

Here, since the present invention is a program for controlling an optical display device of the sixth invention and its effects are the same, a description of those effects is omitted.

Moreover, an optical display device control program of the nineteenth invention is the optical display device control program of the eighteenth invention, wherein the control signal supply unit generates a specific pulse width control signal corresponding to a specific bit of the bit string that indicates the number of gradations; and, the signal delay unit calculates the delay time for the specific pulse width control signal based on the specific bit, and delays the timing by which the specific pulse width control signal is supplied to another optical transmission element beyond the timing by which the specific pulse width control signal is supplied to any one of the two or more optical transmission elements based on the calculated delay time.

Here, since the present invention is a program for controlling an optical display device of the seventh invention and its effects are the same, a description of those effects is omitted.

Moreover, an optical display device control program of the twentieth invention is the optical display device control program of the nineteenth invention, wherein the specific pulse width is equal to the pulse width of a control signal corresponding to the lowermost bit excluding the specific bit of the bit string that indicates the number of gradations.

Here, since the present invention is a program for controlling an optical display device of the eighth invention and its effects are the same, a description of those effects is omitted.

Moreover, an optical display device control program of the twenty-first invention is an optical display device control program of any of the eighteenth through twentieth inventions, wherein the supply interval of the specific pulse width control signal is larger than the specific pulse width.

Here, since the present invention is a program for controlling an optical display device of the ninth invention and its effects are the same, a description of those effects is omitted.

Moreover, an optical display device control program of the twenty-second invention is an optical display device control program of any of the nineteenth through twenty-first inventions, wherein in the case the number of specific bits is represented with n (where n is an integer), and the bit location of the specific bit in the bit string that indicates the number of gradations of the displayed image is represented with m (where m is an integer from 0 to (n−1)), then the signal delay unit calculates the amount of time obtained by multiplying the time of the specific pulse width by a coefficient obtained according to $(2^n-2^m)/2^n$ as the delay time of the specific pulse width control signal.

Here, since the present invention is a program for controlling an optical display device of the tenth invention and its effects are the same, a description of those effects is omitted.

On the other hand, in order to achieve the aforementioned object, a method of controlling gradation of the twenty-third invention is a method applied to an optical system that controls the gradation of a displayed image by arranging two or more optical transmission elements optically in series that have a plurality of optical transmission sections capable of independently controlling a transmission state and non-transmission state of incident light in a specific direction, and synchronously controlling the transmission state and non-transmission state of the two or more optical transmission elements with a control signal based on the number of gradations of the displayed image; including:

a signal delay step capable of delaying the timing by which the control signal is supplied to another optical transmission element by a predetermined amount of time beyond the timing by which the control signal is supplied to any one of the two or more optical transmission elements.

Here, since the present invention is a method realized by a gradation control device and so forth of the first invention and its effects are the same, a description of those effects is omitted.

On the other hand, in order to achieve the aforementioned object, a method of controlling an optical display device of the twenty-fourth invention is a method for controlling an optical display device that displays an image by arranging two or more optical transmission elements optically in series that have a plurality of optical transmission sections capable of independently controlling a transmission state and non-transmission state of incident light in a specific direction, and controlling the transmission state and non-transmission state of the light from a light source by means of the two or more optical transmission elements; including:

a control signal supply step in which a control signal is generated that controls the transmission state and non-transmission state of the optical transmission elements based on the number of gradations of a displayed image, and supplies the generated control signal at a timing that is synchronized to each of the two or more optical transmission elements, and a signal delay step in which the timing by which the control signal is supplied to another optical transmission element is delayed by a predetermined amount of time beyond the timing by which the control signal is supplied to any one of the two or more optical transmission elements.

Here, since the present invention is a method realized by an optical display device and so forth of the second invention and its effects are the same, a description of those effects is omitted.

Moreover, a method of controlling an optical display device of the twenty-fifth invention is the method of controlling an optical display device of the twenty-fourth invention, wherein in the control signal supply step, a plurality of control signals are generated based on the number of gradations of the displayed image, and in the signal delay step, any one of the plurality of control signals is delayed by a predetermined amount of time based on the number of gradations.

Here, since the present invention is a method realized by an optical display device and so forth of the third invention and its effects are the same, a description of those effects is omitted.

Moreover, a method of controlling an optical display device of the twenty-sixth invention is the method of controlling an optical display device of the twenty-fourth invention, wherein in the signal control supply step, a plurality of control signals are generated based on the number of gradations of the displayed-image, and in the signal delay step, the timing by which any of the plurality of control signals is generated is delayed by a predetermined amount of time based on the number of gradations.

Here, since the present invention is a method realized by an optical display device and so forth of the fourth invention and its effects are the same, a description of those effects is omitted.

Moreover, a method of controlling an optical display device of the twenty-seventh invention is the method of controlling an optical display device of any of the twenty-fourth through twenty-sixth inventions, wherein the duration of the transmission state is controlled according to the pulse width of the control signal.

Here, since the present invention is a method realized by an optical display device and so forth of the fifth invention and its effects are the same, a description of those effects is omitted.

Moreover, a method of controlling an optical display device of the twenty-eighth invention is the method of controlling an optical display device of the twenty-seventh invention, wherein in the control signal supply step, a pulse width control signal is generated corresponding to each bit of a bit string that indicates the number of gradations based on the number of gradations of the displayed image, and the generated control signal is supplied based on time-sharing and at a timing that is synchronized to each of the two or more optical transmission elements.

Here, since the present invention is a method realized by an optical display device and so forth of the sixth invention and its effects are the same, a description of those effects is omitted.

Moreover, a method of controlling an optical display device of the twenty-ninth invention is the method of controlling an optical display device of the twenty-eighth invention, wherein in the control signal supply step, a specific pulse width control signal is generated corresponding to a specific bit of the bit string that indicates the number of gradations; and, in the signal delay step, the delay time for the specific pulse width control signal is calculated based on the specific bit, and the timing by which the specific pulse width control signal is supplied to another optical transmission element is delayed beyond the timing by which the specific pulse width control signal is supplied to any one of the two or more optical transmission elements based on the calculated delay time.

Here, since the present invention is a method realized by an optical display device and so forth of the seventh invention and its effects are the same, a description of those effects is omitted.

Moreover, a method of controlling an optical display device of the thirtieth invention is the method of controlling an optical display device of the twenty-ninth invention, wherein the specific pulse width is equal to the pulse width of a control signal corresponding to the lowermost bit excluding the specific bit of the bit string that indicates the number of gradations.

Here, since the present invention is a method realized by an optical display device and so forth of the eighth invention and its effects are the same, a description of those effects is omitted.

Moreover, a method of controlling an optical display device of the thirty-first invention is a method of controlling an optical display device of any of the twenty-eighth through thirtieth inventions, wherein the supply interval of the specific pulse width control signal is larger than the specific pulse width.

Here, since the present invention is a method realized by an optical display device and so forth of the ninth invention and its effects are the same, a description of those effects is omitted.

Moreover, a method of controlling an optical display device of the thirty-second invention is a method of controlling an optical display device of any of the twenty-ninth through thirty-first inventions, wherein in the case the number of specific bits is represented with n (where n is an integer), and the bit location of the specific bit in the bit string that indicates the number of gradations of the displayed image is represented with m (where m is an integer from 0 to (n−1)), then in the signal delay step, the amount of time obtained by multiplying the time of the specific pulse width by a coefficient obtained according to $(2^n-2^m)/2^n$ is calculated as the delay time of the specific pulse width control signal.

Here, since the present invention is a method realized by an optical display device and so forth of the tenth invention and its effects are the same, a description of those effects is omitted.

Moreover, a method of controlling an optical display device of the thirty-third invention is the method of controlling an optical display device of any of the twenty-fifth through thirty-second inventions, wherein the number of optical transmission sections in the two or more optical transmission elements is the same for each optical transmission element.

Here, since the present invention is a method realized by an optical display device and so forth of the eleventh invention and its effects are the same, a description of those effects is omitted.

Moreover, a method of controlling an optical display device of the thirty-fourth invention is the method of controlling an optical display device of any of the twenty-fifth through thirty-third inventions, wherein the two or more optical transmission elements are reflecting optical transmission elements.

Here, since the present invention is a method realized by an optical display device and so forth of the twelfth invention and its effects are the same, a description of those effects is omitted.

DETAILED DESCRIPTION OF THE INVENTION

While preferred embodiments of the present invention have been described and illustrated above, it should be understood that these are exemplary of the invention and are not to be considered as limiting. Additions, omissions, substitutions and other modifications can be made without departing from the spirit or scope of the present invention. Accordingly, the invention is not to be considered as being limited by the foregoing description, and is only limited by the scope of the appended claims.

The following provides an explanation of embodiments of the present invention based on the drawings. FIGS. 1 through 13 are drawings that show embodiments of a projection-type display device that applies a gradation control device, an optical display device, a gradation control device control program, an optical display device control program, a method of controlling gradation and a method of controlling an optical display device as claimed in the present invention.

Figure 1:
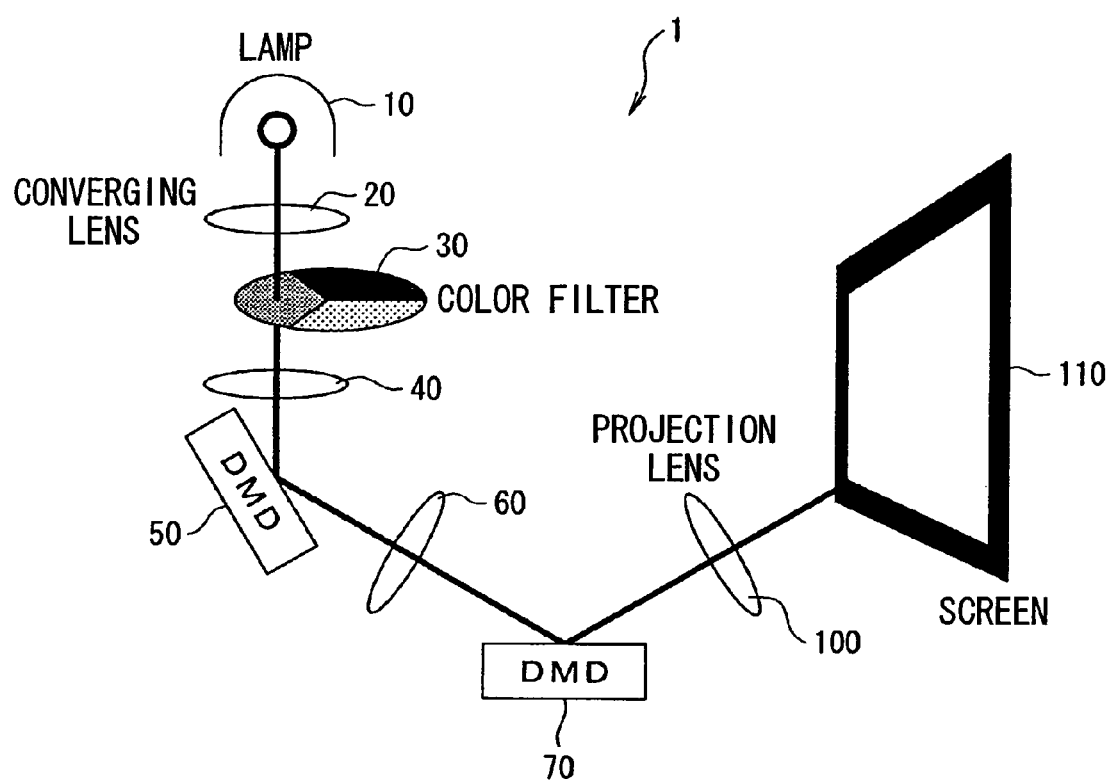
FIG. 1 is a drawing showing the main optical configuration of a projection-type display device 1 as claimed in the present invention.

First, an explanation is provided of the main optical configuration of a projection-type display device 1 as claimed in the present invention based on FIG. 1. FIG. 1 is a drawing showing the main optical configuration of a projection-type display device 1 as claimed in the present invention.

As shown in FIG. 1, projection-type display device 1 contains a light source 10, a color filter 30, a first DMD 50 and a second DMD 70, a projection lens 100 and a screen 110, and these are arranged in series optically.

Light source 10 is composed of a light source lamp comprising a high-pressure mercury lamp or xenon lamp, and a reflector that collects light from the light source.

First DMD 50 and second DMD 70 have a constitution in which a plurality of micromirrors, which are capable of independently controlling the reflection angle of incident light according to control signals from the outside, are arranged in the form of a matrix.

Color filter 30 employs a constitution in which a single circular glass surface is coated with a dichroic film respectively corresponding to the three colors of light of red (R), green (G) and blue (B). Moreover, color filter 30 rotates itself corresponding to a control signal from the outside to switch the surface arranged in the light path to a surface of the dichroic film corresponding to any of the aforementioned three colors. Only the corresponding color of light within the white light entering from the light source is allowed to pass through the filter and exit towards first DMD 50.

Projection lens 100 is for projecting light reflected in second DMD 70 onto screen 110 to display a desired image on said screen 110.

In addition, as shown in FIG. 1, a converging lens 20 is arranged on the incident side of color filter 30, a converging lens 40 is arranged on the incident side of first DMD 50, and a converging lens 60 is arranged on the incident side of second DMD 70. These converging lens 20, 40 and 60 function to efficiently transmit light to optical elements arranged in their respective latter stages. Here, lenses and so forth having a function that adjusts the distribution of the exit angles of incident light are used for the converging lens.

The following provides an explanation of the overall flow of light transmission in projection-type display device 1.

White light from light source 10 enters color filter 30 through converging lens 20 and only colored light of one of the three primary colors of R, G and B in the dichroic filter of said color filter 30 is transmitted. This transmitted colored light then enters first DMD 50 through converging lens 40. First DMD 50 reflects the incident colored light towards the direction corresponding to the reflection angle of the micromirrors.

In the present embodiment, first DMD 50 and optical elements in front of and after first DMD 50 are arranged so that light reflected in first DMD 50 is reflected towards the following second DMD 70 at one reflection angle, and reflected towards a light absorbing material not shown at other reflection angles.

Moreover, light reflected towards second DMD 70 in first DMD 50 enters second DMD 70 through converging lens 60. This incident light is reflected towards the direction corresponding to the reflection angle of the micromirrors in second DMD 70 in the same manner as first DMD 50.

In the present embodiment, second DMD 70 and optical elements in front of and after second DMD 70 are arranged so that light reflected in second DMD 70 is reflected towards the following projection lens 100 at one reflection angle, and reflected towards a light absorbing material not shown at other reflection angles.

Light reflected towards projection lens 100 in second DMD 70 is projected onto screen 110 through projection lens 100. A desired image is displayed on screen 110 by this projected light.

Moreover, projection-type display device 1 has a display control device 2 that controls first DMD 50 and second DMD 70. The following provides a detailed explanation of the constitution of display control device 2 based on FIG. 2.

Figure 2:
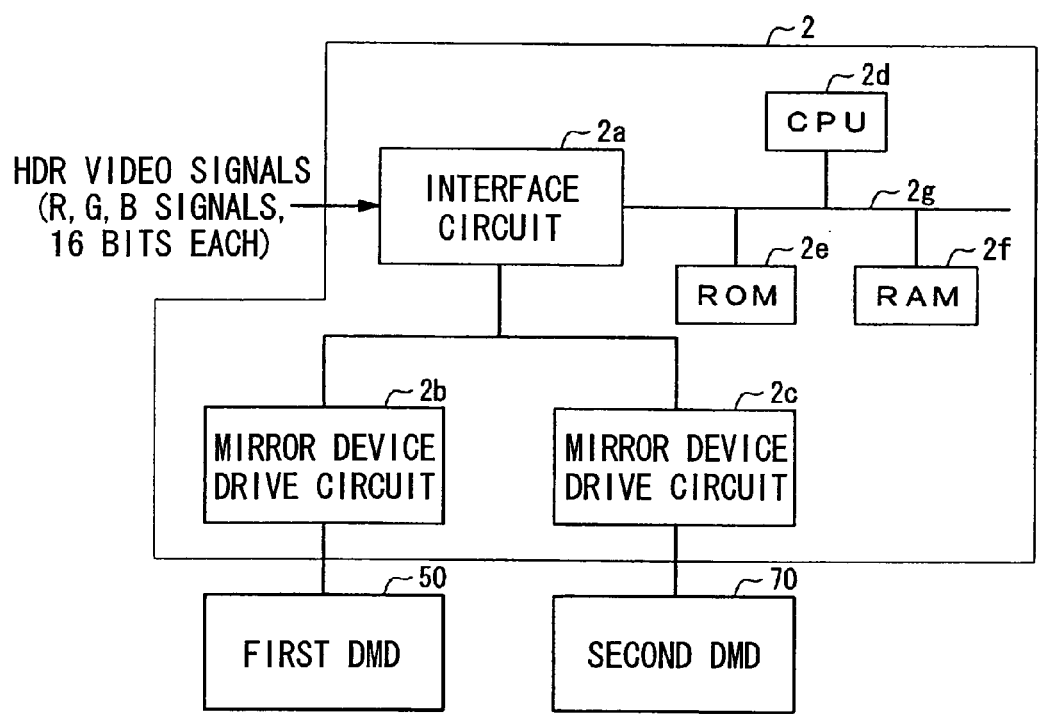
FIG. 2 is a block diagram showing the hardware configuration of a display control device 2.

FIG. 2 is a block diagram showing the hardware configuration of display control device 2.

As shown in FIG. 2, display control device 2 is composed to comprise an interface circuit 2a that acquires HDR video signals, RGB signals and other signal from the outside and transmits each constituent element of each signal, a mirror device drive circuit 2b for controlling the driving of the micromirrors of first DMD 50, a mirror device drive circuit 2c for controlling the driving of the micromirrors of second DMD 70, a CPU 2d that controls computations and the entire system based on a control program, a ROM 2e that contains the control program of CPU 2d in a predefined area, and a RAM 2f for containing data read from ROM 2e and so forth and computation results required for the computation process of CPU 2d. Moreover, interface circuit 2a, CPU 2d, ROM 2e and RAM 2f are mutually connected to allow exchange of data with bus 2g serving as a signal line for transmitting data.

In the present embodiment, projection-type display device 1 displays an HDR image on screen 110 by time-shared control of the reflection angles of the micromirrors of first DMD 50 and second DMD 70 in display control device 2 based on HDR video signals and RGB signals from the outside.

Here, HDR video data is image data capable of realizing a high luminance dynamic range unable to be realized with conventional sRGB and other image formats, and contains pixel values indicating pixel luminance level for all pixels of the image. In the present embodiment, a format is used for HDR display data in which pixels values that indicate luminance level are contained as floating decimal point values for each of the three primary colors of red, green and blue for a single pixel. For example, a value of (1.2, 5.4, 2.3) may be contained as the pixel value of a single pixel.

In addition, HDR image data is generated based on a captured HDR image by capturing an HDR image having a high luminance dynamic range. Furthermore, details regarding methods for generating HDR image data are described in, for example, Known Reference 1, "P. E. Debevec, J. Malik, "Recovering High Dynamic Range Radiance Maps from Photographs", Proceedings of ACM SIGGRAPH97, pp. 367-378 (1997)".

In the present embodiment, projection-type display device 1 is compatible with a representation format of 16 bits per pixel, and employs a data format in which each pixel is represented with a 16-bit floating decimal point value. Here, since it is necessary to impart a control value of the same format for DMD, it may be necessary to convert to a 16-bit control value depending on the particular case. In addition, in the case of input of a 16-bit floating decimal point representation in the manner of HDR image data, normalization is performed by image processing such as maximum luminance correction followed by conversion to a 16-bit control value.

Moreover, the following provides an explanation of specific display control processing of HDR images in display control device 2.

Figure 3:
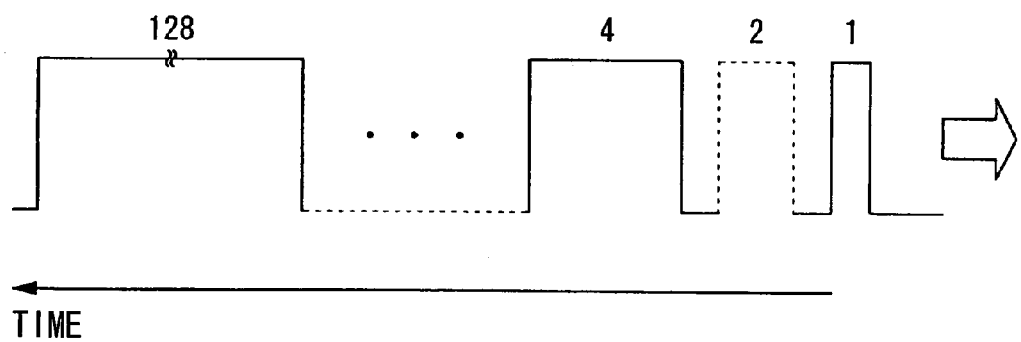
FIG. 3 is a drawing showing the basic waveform used for display control.
Figure 4:
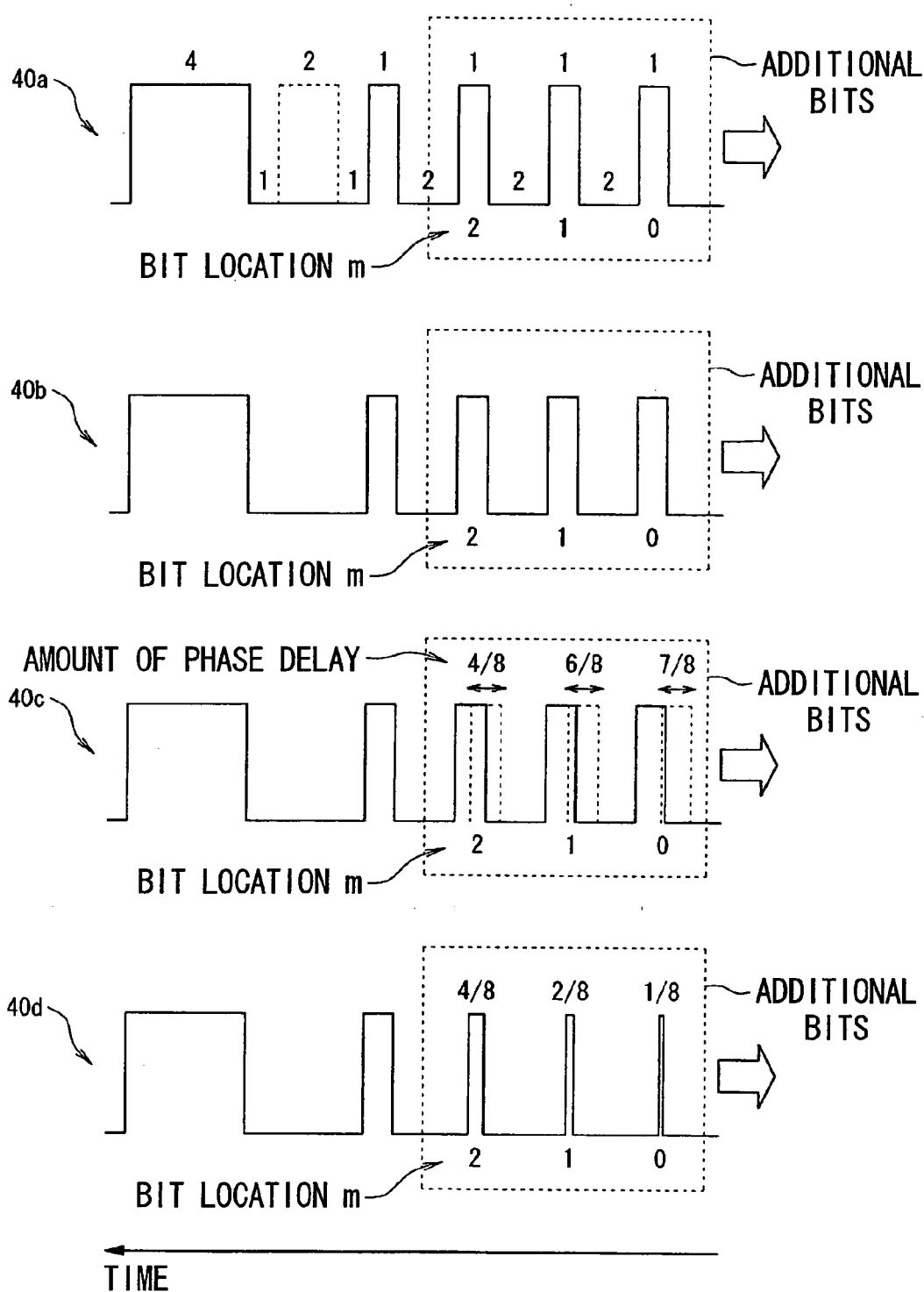
FIG. 4 is a drawing showing examples of drive control waveforms for expanding the number of gradations of an HDR image.

FIG. 3 is a drawing showing a basic waveform used for display control, while FIG. 4 is a drawing showing examples of drive control waveforms for expanding the number of gradations of an HDR image.

First, interface circuit 2a acquires an HDR video signal and RGB signal from the outside, converts these acquired signals into digital data, and then transmits the data to RAM 2f. RAM 2f stores the transmitted HDR video data and RGB data at a predetermined memory area.

On the other hand, CPU 2d starts up the control program in response to the power being turned on, operates the program when HDR image data is contained in a specific area of RAM 2f, extracts information on the number of gradations of each pixel by analyzing HDR video data and RGB data stored in RAM 2f, and generates control signal waveform data for driving each of the micromirrors of first DMD 50 and second DMD 70 based on the number of gradations. In the present embodiment, the number of gradations is represented as the sum of the values that can be expressed as a multiple of 2, and as shown in FIG. 3, a waveform of a pulse width corresponding to each value is generated as the control signal. Here, FIG. 3 shows the drive waveform with respect to one pixel (one micromirror) of a DMD, and the reflection angle of the micromirrors of the DMD are controlled so that light is reflected in a target direction only for the duration of the pulse width corresponding to a multiple of 2. For example, in the case the number of gradations is "133" decimal, then it would be expressed in the form of the sum of the multiples of 2 in the manner of "1+4+128", and control signals are generated having pulse widths that correspond to the constituent elements of "1", "4" and "128", respectively.

However, the aforementioned explanation of the generation of waveform data is given for the case of focusing on a single pixel of an HDR image, while in actuality, it is necessary to generate waveform data for all of the pixels of an HDR image.

Here, in the present embodiment, the maximum number of gradations of an image that can be displayed during synchronous control of first DMD 50 and second DMD 70 is taken to be 8 bits. In addition, the reflection angle of each micromirror is controlled so that light from light source 10 is transmitted towards projection lens 100 for only the duration corresponding to the pulse width by respectively supplying a high level control signal (waveform rising period) to first DMD 50 and second DMD 70. In other words, when a high level signal is not supplied (waveform falling period), each reflection angle is controlled so that incident light is reflected towards a light absorbing material for both first DMD 50 and second DMD 70.

Control signal waveform data generated by the control program is transmitted to mirror device drive circuits 2b and 2c through interface circuit 2a. Mirror device drive circuits 2b and 2c generate control signals based on the acquired waveform data, and supply control signals generated at a synchronous timing to first DMD 50 and second DMD 70 on the basis of time sharing to carry out drive control of the reflection angles and reflection times of each of these micromirrors. In other words, by using time-shared control and pulse width modulation (PWM) control using a plurality of control signals having different pulse widths, gradations are represented with the cumulative transmission time of the light. As a result, the gradation of HDR images is displayed on screen 110 as a result of the two states of transmission and non-transmission of light to projection lens 100 and the light transmission time being controlled corresponding to the number of gradations.

Moreover, in the present embodiment, it is also possible to display HDR images in which the number of gradations exceeds 8 bits by expanding the number of gradations.

For example, an HDR image having "1669" gradations is considered. In order realize "1669" gradations, it is necessary to have the ability to be able to display 11-bit gradations. In other words, it is necessary to add control for displaying 3 bits of gradations corresponding to "1024", "512" and "256".

In order to realize the aforementioned 11-bit gradation display in the present embodiment, the control signal of the pulse width corresponding to "128" of the pulse width control signals corresponding to the 8-bit gradations in synchronous control is made to correspond to "1024", while the control signals respectively corresponding to "64-1" are similarly made to respectively correspond to "512-8". The three bits corresponding to the remaining "4", "2" and "1" are treated as additional bits. The three pulse width control signals corresponding to "1" in the aforementioned synchronous control are used for these three additional bits. In other words, the control signals of the minimum pulse width during synchronous control are used as additional control signals.

Moreover, the aforementioned three control signals are supplied to second DMD 70 by delaying by a predetermined amount of time beyond the timing by which they are supplied to first DMD 50. In other words, as a result of delaying the supply of control signals to second DMD 70, light is transmitted to a target location only during the time the light transmission time of first DMD 50 and the light transmission time of second DMD 70 partially overlap. Thus, by adjusting each delay time so that light is transmitted to projection lens 100 only during the time corresponding to each of the additional bits of "1", "2" and "4", light transmission time can be controlled corresponding to the three additional bits. However, it is necessary to make the delay time different for each additional control signal, and shorter than the pulse width of each control signal.

An explanation of the specific operation of gradation display processing of an HDR image by expanding the number of gradations as described above is provided based on FIG. 4. In FIG. 4, the number of gradations that can be displayed by synchronous control is assumed to be three bits for the sake of convenience, and the explanation uses the case of gradation display of an HDR image having 6-bit gradation.

First, an HDR video signal and RGB signal corresponding to HDR image data having 6-bit gradation is input from the outside through interface circuit 2a. The input signal is contained in a specific area of RAM 2f in the form of digital data, as a result of which the control program begins to operate.

Here, this operation is explained while focusing on one pixel "47" of the number of gradations of the HDR image.

First, the additional bit number "3" is calculated based on the bit number of the number of gradations (6 bits) by the control program. Next, control signal waveform data is generated for the upper 3 bits of the gradation number "47(101111)". In this case, waveform data is generated for the control signals corresponding to the upper three bits of "101". This waveform data corresponds with pulse width control signals used in synchronous control as previously described. Thus, pulse width control signals corresponding to bits "8" and "1" of the 3 bits of the number of gradations correspond to 1 bit in the upper 3 bits.

Moreover, although control signal waveform data corresponding to the lower three bits "111" is generated by the control program, the portion of these lower three bits is treated as an additional bit, and waveform data is generated for adding three pulse width waveforms corresponding to "1" in the pulse width control signals corresponding to the three bits during synchronous control. Control signals added as additional bits will be referred to as specific control signals. When the number of specific control signals to be added has been determined, the delay time of each specific control signal is calculated. In the present embodiment, delay time is calculated using formula (1) shown below. Delay time is calculated by multiplying the value calculated in formula (1) by the time of the pulse width of a specific control signal.

$$(2^n - 2^m)/2^n \quad (1)$$

In this formula, n represents the number of specific control signals added, while m represents the applicable bit location of an additional bit in the gradation data.

In the case of the gradation number "47(101111)", the number added n is 3, and the applicable bit locations m consist of the three locations of "2, 1, 0" respectively corresponding to the 2nd bit, 1st bit and 0th bit among the lower three bits. When these values are entered into the aforementioned formula (1), the results of the calculation become "$(2^3-2^2)/2^3=4/8$", "$2^3-2^1/2^3=6/8$" and "$2^3-2^0/2^3=7/8$".

When the aforementioned calculation results are respectively multiplied by the pulse width times of the specific control signals, delay times are calculated for specific control signals corresponding to the applicable bit locations of "2, 1, 0", respectively.

In this manner, when the number of additional bits and delay time are calculated, waveform data corresponding to the upper three bits and information on the number of additional bits is transmitted to mirror device drive circuit 2b through interface circuit 2a, while waveform data corresponding to the upper three bits and information on the number of additional bits is transmitted to mirror device drive circuit 2c through interface circuit 2a.

Mirror device drive circuits 2b and 2c generate control signals based on the acquired information, and supply them to each of the micromirrors of first DMD 50 and second DMD 70 at a timing that is synchronized to the control signals corresponding to the upper three bits of the number of gradations of the HDR image. On the other hand, specific control signals corresponding to the lower three bits of the number of gradations of the HDR image, together with being supplied in order starting from the upper bit to first DMD 50, are supplied to second DMD 70 after being delayed (by controlling the phase) by the amount of each delay time as calculated above beyond the timing at which they are supplied to first DMD 50.

In other words, as in 40a shown in FIG. 4, the control signals supplied to one pixel (one micromirror) of first DMD 50 are such that in addition to the pulse width control signal corresponding to "32" of the upper three bits and the pulse width control signal corresponding to "8", three specific control signals of the additional bits are supplied at the timing shown in 40a. Furthermore, the values depicted above the control signals shown in FIG. 4 indicate times, with the time of the pulse width corresponding to "32" being "4", the time of the pulse width corresponding to "8" being "1", and the time of the pulse width corresponding to the specific control signals being "1". Moreover, the values depicted between the control signals in FIG. 4 also represent times, and in the control signals corresponding to the upper three bits, the time interval between control signals is "1", while the time interval between the specific control signals is "2". In other words, the time interval between the specific control signals is equal to twice the pulse width of the specific control signals. As a result of making the time interval twice as large, specific control signals supplied after delaying to second DMD 70 are prevented from overlapping with specific control signals subsequently supplied to first DMD 50.

On the other hand, the control signals supplied to one pixel (one micromirror) of second DMD 70 are similar to the control signals supplied to one pixel of first DMD 50 as in 40b shown in FIG. 4. However, as in 40c shown in FIG. 4, the control signals corresponding to the upper three bits are synchronized with the timing by which they are supplied to first DMD 50, and the three specific control signals corresponding to the lower three bits are respectively delayed by the delay times calculated above (4/8, 6/8 and 7/8). Furthermore, the values depicted below the specific control signals shown in FIG. 4 represent the applicable bit locations. In other words, as shown in 40c of FIG. 4, the specific control signal corresponding to bit position "2" is delayed by "4/8", the specific control signal corresponding to bit position "1" is delayed by "6/8", and the specific control signal corresponding to bit position "0" is delayed by "7/8" before being supplied to second DMD 70. Here, as shown in 40c of FIG. 4, timing by which specific control signals are supplied to one pixel of first DMD 50 becomes the signal waveforms indicated with dotted lines.

As a result of mirror device drive circuits 2b and 2c supplying control signals based on waveform data to each pixel of first DMD 50 and second DMD 70 at the timing shown in 40c of FIG. 4, light is transmitted to projection lens 100 on the basis of time sharing for the duration of the pulse width of the control signals supplied to the upper three bits as shown in 40d of FIG. 4. On the other hand, light is transmitted on the basis of time sharing for the duration during which the specific control signals respectively supplied to first DMD 50 and second DMD 70 for the lower three bits partially overlap due to the shift produced by the aforementioned delay times. More specifically, as shown in 40d of FIG. 4, light is transmitted to projection lens 100 for the duration of "4/8" according to the specific control signal of bit position 2, for the duration of "2/8" according to the specific control signal of bit position 1, and for the duration of "1/8" according to the specific control signal of bit position 0 for the lower three bits. Consequently, HDR images having 6 bits of gradations can be displayed on projection display device 1 capable of 3-bit gradation display as a result of time sharing and synchronous control.

Figure 5:
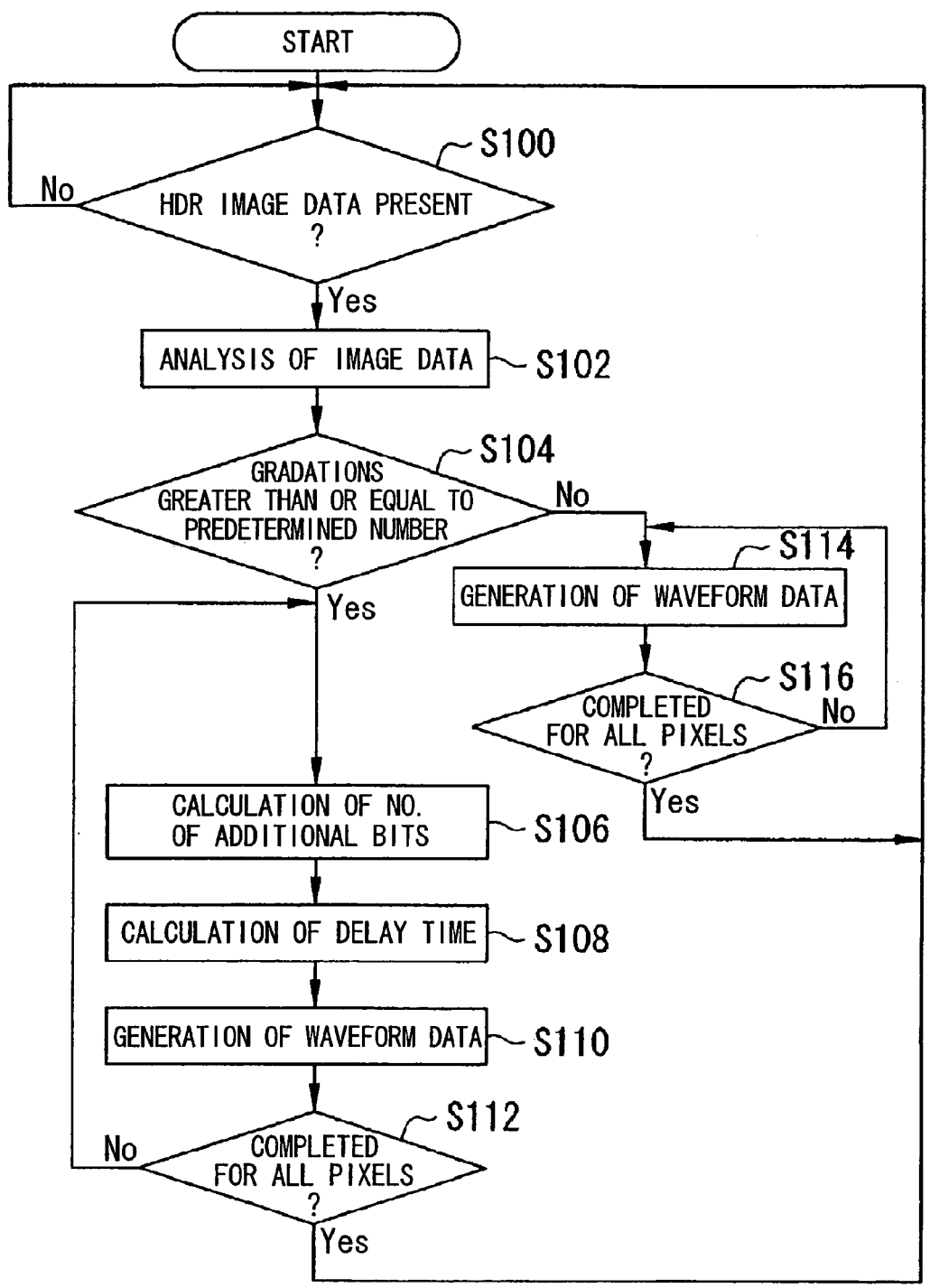
FIG. 5 is a flow chart showing waveform data generation processing.

Moreover, an explanation is provided of the flow of waveform data generation processing in accordance with a control program in display control device 2 based on FIG. 5. FIG. 5 is a flow chart showing waveform data generation processing.

When the power of display control device 2 is turned on to start up the control program, as shown in FIG. 5, operation first proceeds to Step S100 where a judgment is made as to whether or not HDR image data is contained in a specific area of RAM 2f, and in the case said data is judged to be contained therein (Yes), then the operation proceeds to Step S102, while in the case said data is not contained (No), operation waits until said data is contained.

In the case operation has proceeded to Step S102, operation proceeds to Step S104 after analyzing the HDR image data contained in RAM 2f.

In Step S104, a judgment is made as to whether or not the number of gradations of the HDR image is equal to or exceeds a predetermined number based on the analysis results, in the case of having been judged to be equal to or exceed the predetermined number (Yes), operation proceeds to Step S106. If is it not (No), operation proceeds to Step S114. For example, the predetermined number is 257 in the case the number of gradations that can be displayed in synchronous control is 256.

In the case operation has proceeded to Step S106, the number of additional bits for the bits of the number of gradations in synchronous control is calculated based on the number of gradations of the HDR image, after which operation proceeds to Step S108.

In Step S108, the delay time is calculated using the aforementioned formula (1) based on the number of additional bits after which operation proceeds to Step S110.

In Step S110, waveform data is generated for generating control signals required for gradation display based on the aforementioned calculated number of additional bits and delay time, after which operation proceeds to Step S112.

In Step S112, a judgment is made as to whether or not generation of waveform data has been completed for all pixels of the HDR image, and in the case it is judged to be completed (Yes), operation proceeds to Step S100, and it is judged to not be completed (No), operation proceeds to Step S106.

On the other hand, in the case operation has proceeded to Step S114 as a result of the number of gradations of the HDR image being smaller than the predetermined number of gradations in Step S104, waveform data is generated for generating a pulse width control signal corresponding to each bit of the number of gradations, and operation proceeds to Step S116.

In Step S116, a judgment is made as to whether or not waveform data has been generated for all pixels of the HDR image, and in the case it is judged to be completed (Yes), operation proceeds to Step S100, while if it is judged to not be completed (No), operation proceeds to Step S114.

As has been described above, projection display device 1 is capable of gradation display of HDR images by time-shared and synchronous drive control of first DMD 50 and second DMD 70 by mirror device drive circuits 2b and 2c controlled by display control device 2.

Moreover, the number of gradations that can be displayed can be expanded by delaying by a predetermined amount of time the timing by which specific control signals are added to the control signals during synchronous control and said specific control signals are supplied to mirror device drive circuit 2c relative to the timing by which specific control signals are supplied to mirror device drive circuit 2b. As a result, HDR images having a number of gradations greater than the maximum number of gradations that can be displayed can be displayed by synchronous drive control of first DMD 50 and second DMD 70.

[Variation 1]

Figure 6:
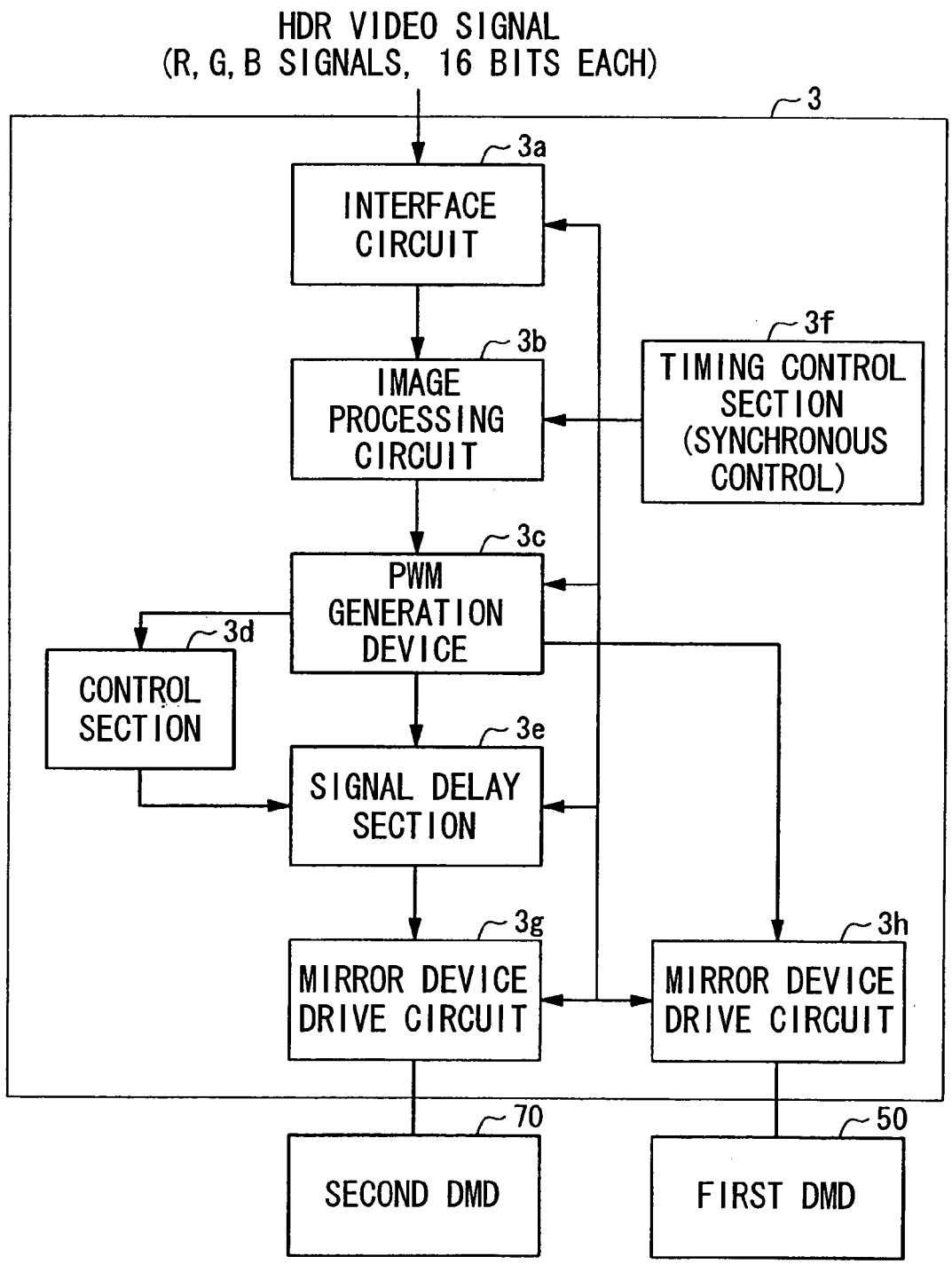
FIG. 6 is a block diagram showing the hardware configuration of a display control device 3.

Although gradation display processing of HDR images was carried out by software control in the aforementioned embodiment, in Variation 1, an explanation is provided of a display control device 3 in which gradation display processing is performed by hardware based on FIG. 6. This display control device 3 is applied instead of display control device 2 in projection display device 1 shown in FIG. 1.

Here, FIG. 6 is a block diagram showing the hardware configuration of display control device 3.

As shown in FIG. 6, display control device 3 is composed to comprise an interface circuit 3a that acquires data from the outside and transmits various data to each constituent element, an image processing circuit 3b that performs the necessary corrective processing for performing gradation display processing on HDR image data acquired from the outside, a PWM generation device 3c that generates control signals of the required pulse width for gradation display of HDR images, a control section 3d that controls signal delay processing in signal delay section 3e, a signal delay section 3e that delays control signals from PWM generation device 3c according to the control by control section 3d, a timing control section 3f that controls the timing of each signal supplied to each constituent element, a mirror device drive circuit 3h that drives the micromirrors of first DMD 50 corresponding to a control signal, and a mirror device drive circuit 3g that drives the micromirrors of second DMD 70 corresponding to a control signal.

The following provides an explanation of the specific operation of display control device 3.

HDR image data input from the outside is transmitted to image processing circuit 3b through interface circuit 3a. In image processing circuit 3b, the control value of each pixel is extracted from the HDR image data, and the extracted control values are corrected by normalization and so forth and converted to data corresponding to gradation display processing to generate control data. The generated control data is then transmitted to PWM generation device 3c. PWM generation device 3c generates pulse width control signals required for gradation display of the input HDR image based on the control data from image processing circuit 3b. Here, in the case HDR image data has been input that is equal to or less than a predetermined number of gradations (e.g., 255), PWM generation device 3c generates pulse width control signals corresponding to each bit of the number of gradations similar to the aforementioned display control device 2, and then respectively inputs these generated control signals to control section 3d, delay control section 3e and mirror device drive circuit 3h. In this case, control section 3d judges that delay is not required, and controls so that delay control section 3e transmits the control signals from PWM generation device 3c to mirror device drive circuit 3g without modifying them. Mirror device drive circuits 3g and 3h drive first DMD 50 and second DMD 70 at a timing synchronous to the acquisition of control signals from PWM generation device 3c to control the reflection angle of each micromirror. In this manner, the reflection angle of each micromirror of first DMD 50 and second DMD 70 is control on the basis of time sharing, and gradation display of the HDR image is performed by controlling the cumulative delay time of the light to projection lens 100.

On the other hand, in the case HDR image data having a number of gradations larger than a predetermined number of gradations has been input, the additional number of bits that exceeds the predetermined number of gradations is determined in image processing circuit 3b. Moreover, image processing circuit 3b generates control data such that PWM generation device 3c generates a control signal of the minimum pulse width (to be referred to as a specific control signal) for the lower bit of the aforementioned additional bits in the bit string of the gradation data, and generates pulse width control signals corresponding to each of the other bits for each of these bits. This control data is then input to PWM generation device 3c where control signals are generated corresponding to the control data which are then respectively input to control section 3d, delay control section 3e and mirror device drive circuit 3h. Here, PWM generation device 3c also transmits bit location data to control section 3d.

In this case, control section 3d judges that it is necessary to delay the specific control signals, and performs control that delays each specific control signal in control delay section 3e by a delay time corresponding to the number of additional bits. Here, the delay time is preliminarily determined according to the aforementioned formula (1) corresponding to several numbers of additional bits, and retained in control section 3d. Control signals from PWM generation device 3c are synchronously supplied to signal delay section 3e and mirror device drive circuit 3h, after which signal delay section 3e delays the specific control signals corresponding to the instructions of control section 3d and supplies them to mirror device drive circuit 3h, while other control signals are supplied to mirror device drive circuit 3g without being modified.

In other words, specific control signals for the number of additional bits are supplied to second DMD 70 after being delayed by a predetermined amount of time beyond the timing by which they are supplied to first DMD 50. In other words, by delaying the supply of control signals to second DMD 70, light is transmitted to a target location for only the amount of time during which the light transmission time of first DMD 50 and the light transmission time of second DMD 70 partially overlap. Thus, by adjusting each delay time so that light is transmitted to projection lens 100 for only the amount of time corresponding to each additional bit, the light transmission time corresponding to each additional bit can be controlled. However, it is necessary to make the delay times different for each additional control signal, and shorter than the pulse width of each control signal. In this manner, in addition to being able to perform gradation display of HDR images by time-based control of the reflection angle of each micromirror of first DMD 50 and second DMD 70 to control the cumulative transmission time of light to projection lens 100, the number of gradations that can be displayed is expanded by delayed control of second DMD 70 as a result of adding specific control signals and delaying the supply of the specific control signals to mirror device drive circuit 3g beyond the timing by which they are supplied to mirror device drive circuit 3h by a predetermined amount of time for each signal.

Furthermore, in the present Variation 1, although a constitution is employed in which first DMD 50 and second DMD 70 are driven by generating control signals directly linked to the driving contents shown in FIG. 4, the present invention is not limited to this, but rather a constitution may be employed in which first DMD 50 and second DMD 70 are driven by control signals that differ from the control signals shown in FIG. 4 corresponding to the driving method of mirror device drive circuits 3g and 3h.

For example, in the case of a system in which mirror device drive circuits 3g and 3h drive first DMD 50 and second DMD 70 by control signals of a different type than the control signals shown in FIG. 4 (such as switching of the reflection angles by one-shot pulses), control signals corresponding to this drive method are generated in PWM generation device 3c so that first DMD 50 and second DMD 70 are driven according to target driving contents as shown in FIG. 4.

[Variation 2]

Figure 7:
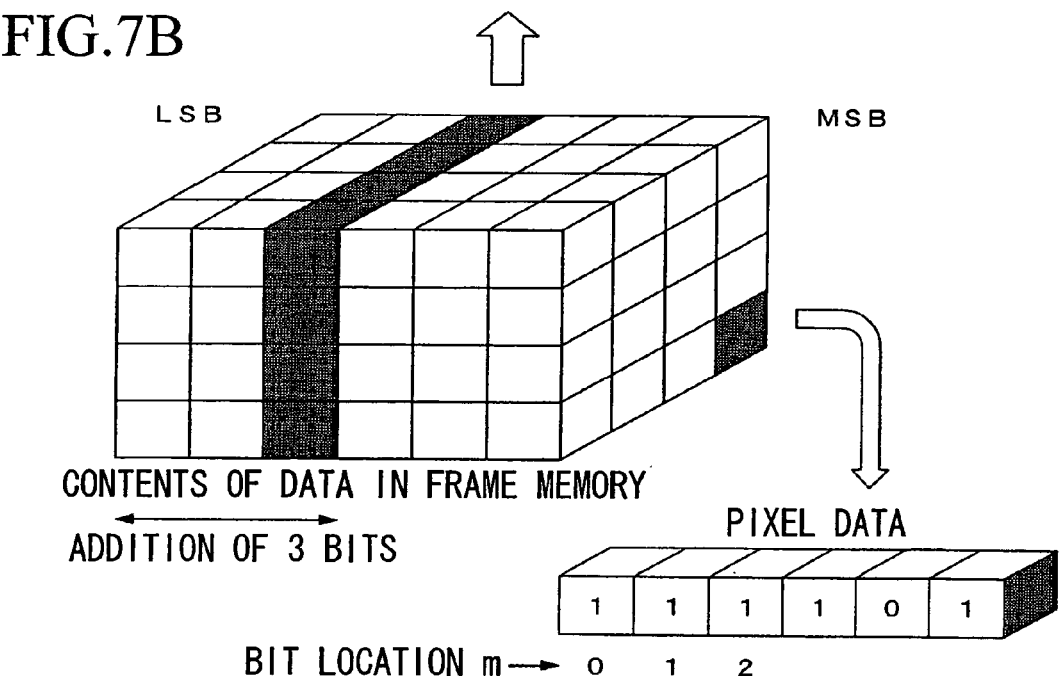
FIG. 7A is a drawing showing the gradation data of a single screen in one frame corresponding to a bit containing gradation data.
FIG. 7B is a drawing showing the gradation data required for gradation display of a single HDR image.
FIG. 7C is a drawing showing the gradation data required for gradation display of a single pixel of an HDR image.
Figure 8:
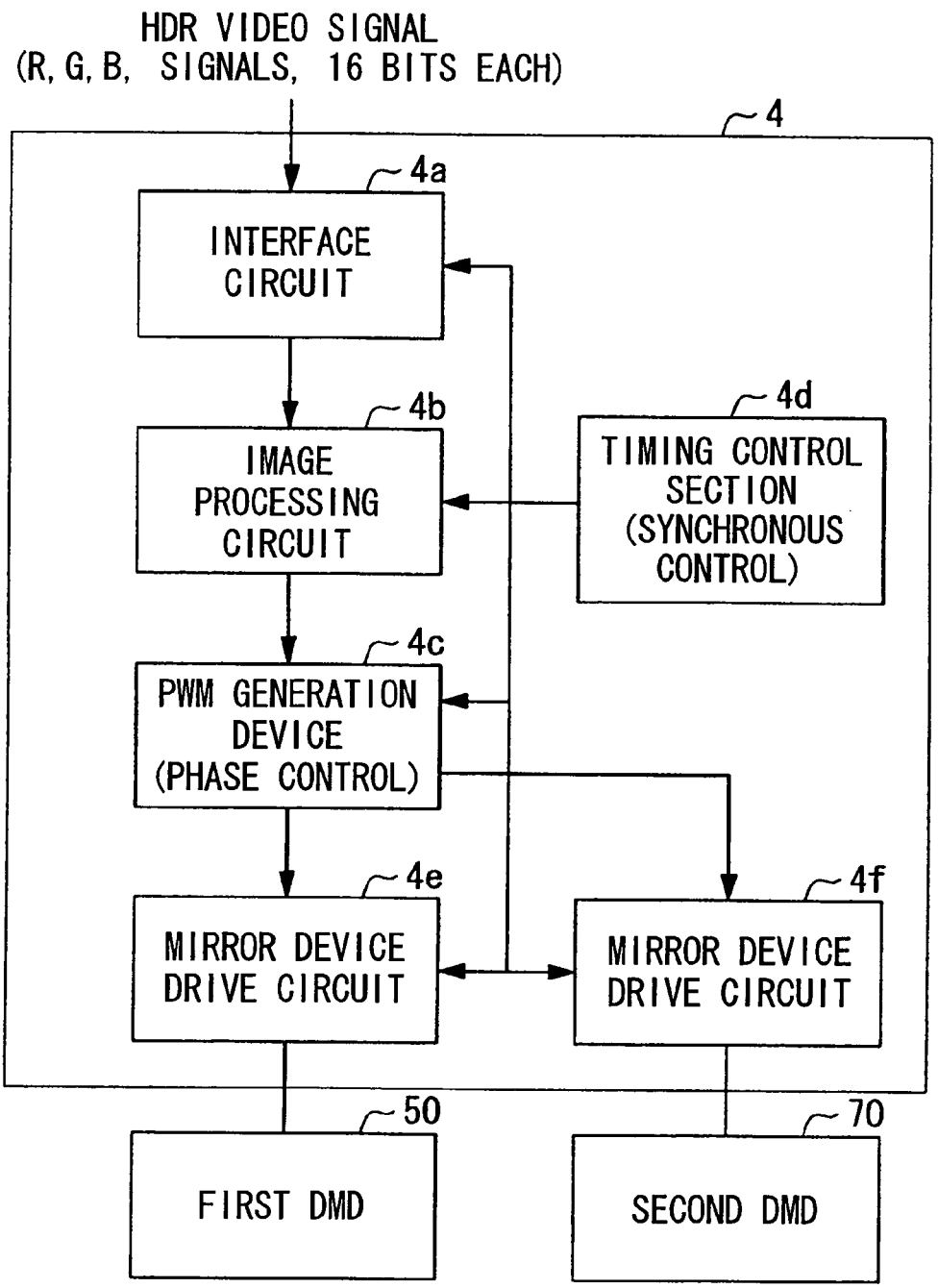
FIG. 8 is a drawing showing the hardware configuration of a display control device 4.
Figure 9A:
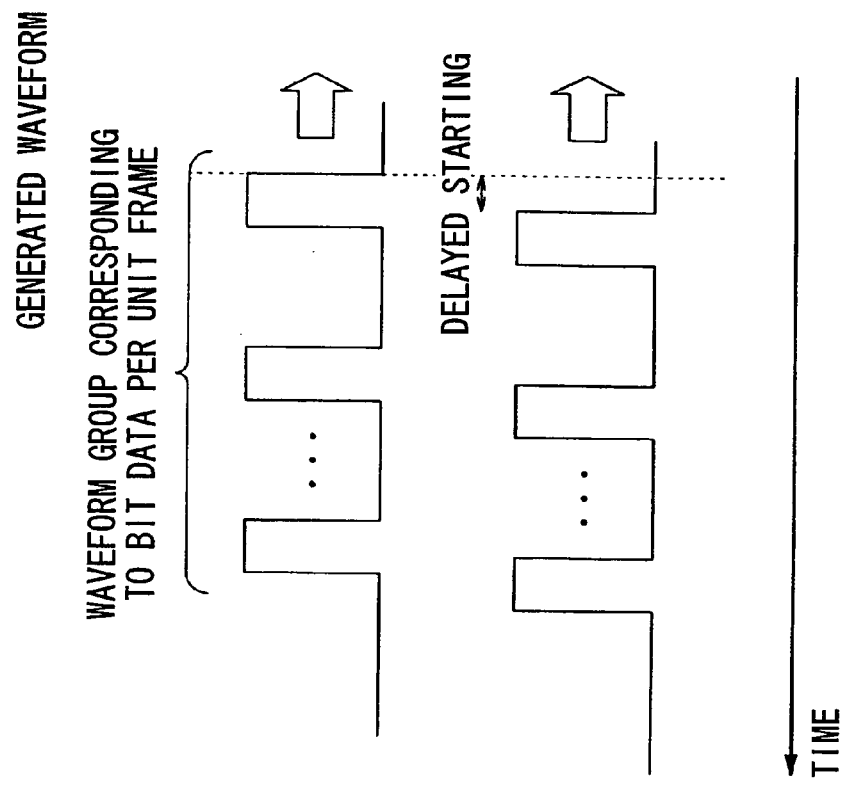
FIG. 9A is a drawing showing the detailed configuration of a PWM generation device 4c.
Figure 9B:
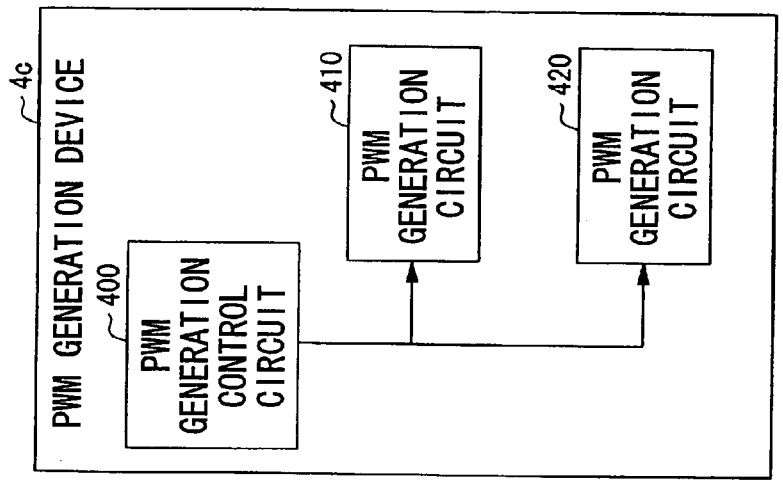
FIG. 9B is a drawing showing an example of a generated waveform of a PWM generation device 4c.

Moreover, an explanation is provided based on FIGS. 7 through 9 of a second variation in the form of a display control device 4 that performs expansion processing of the number of gradations by delaying the start of waveform generation processing of control signals that control DMD. This display control device 4 is applied in place of display control device 2 in the projection-type display device 1 shown in FIG. 1. Here, FIGS. 7A through 7C are drawings showing an example of a method for storing control data for gradation display in a frame memory not shown, FIG. 8 is a drawing showing the hardware configuration of display control device 4, FIG. 9A is a drawing showing the detailed constitution of PWM generation device 4c, and FIG. 9B is a drawing showing examples of waveforms generated in PWM generation device 4c.

As shown in FIG. 8, display control device 4 is composed to comprise an interface circuit 4a that acquires data from the outside and transmits various data to each constituent element, an image processing circuit 4b that performs the necessary corrective processing for performing gradation display processing on HDR image data acquired from the outside, a PWM generation device 4c that generates control signals of the required pulse width for gradation display of HDR images while also performing delay control of control signals, a timing controller 4d that controls each type of timing for signals supplied to each constituent element, a mirror device drive circuit 4e that drives the micromirrors of first DMD 50 corresponding to a control signal, and a mirror device drive circuit 4f that drives the micromirrors of second DMD 70 corresponding to a control signal.

Here, in the case the resolution of first DMD 50 and second DMD 70 is taken to be 4 vertically and 4 horizontally each, gradation data of an HDR image is stored in frame memory according to the contents shown in FIGS. 7A through 7C. In other words, FIG. 7A represents gradation data of a single screen in one frame corresponding to a bit of the gradation data (here, relevant bit location 2), FIG. 7C represents the gradation data required for gradation display of one pixel of the HDR image, and FIG. 7B represents the gradation data required for gradation display of a single HDR image. The storage locations of this gradation data corresponds on a one-to-one basis to the pixels of the HDR image. In addition, in display control section 4, drive control of the micromirrors in first DMD 50 and second DMD 70 is carried out in screen units as shown in FIG. 7A. In the case of an HDR image having six bits of gradations, the aforementioned control signals are generated in order for each screen with respect to the six screens corresponding to the upper three bits and the lower three bits. Mirror device drive circuits 4e and 4f simultaneously drive the micromirrors corresponding to each screen according to control signals of each screen.

Moreover, as shown in FIG. 9A, PWM generation device 4c is composed by comprising PWM generation control circuit 400, which controls the timing of generation of control signal waveforms of PWM generation circuits 410 and 420, PWM generation circuit 410, which generates control signal waveforms for mirror device drive circuit 4e according to the control of PWM generation control circuit 400, and PWM generation circuit 420, which generates control signal waveforms for mirror device drive circuit 4f according to the control of PWM generation control circuit 400.

The following provides an explanation of the specific operation of control display device 4.

HDR image data input from the outside is transmitted to image processing circuit 4b through interface circuit 4a. In image processing circuit 4b, the control value of each pixel is extracted from the HDR image data, and the extracted control values are corrected by normalization and so forth and converted to data corresponding to gradation display processing to generate control data. The generated control data is then transmitted to PWM generation device 4c. PWM generation device 4c generates pulse width control signals required for gradation display of the input HDR image based on the control data from image processing circuit 4b. Here, in the case HDR image data has been input that is equal to or less than a predetermined number of gradations (e.g., 255), PWM generation device 4c generates pulse width control signals for one screen corresponding to each bit of the number of gradations according to PWM generation control circuit 400 at the same timing in PWM generation circuits 410 and 420, and then respectively inputs these generated control signals to mirror device drive circuits 4e and 4f on the basis of time sharing.

Mirror device drive circuits 4e and 4f control the reflecting direction of each micromirror by driving first DMD 50 and second DMD 70 at a timing synchronized to the acquisition of control signals from PWM generation device 4c. In this manner, gradation display of HDR images is performed by controlling the cumulative transmission time of light to projection lens 100 by time-shared control of the reflecting directions of each micromirror of first DMD 50 and second DMD 70.

On the other hand, in the case HDR image data of a number of gradations larger than a predetermined number of gradations has been input, the number of additional bits in excess of the predetermined number of gradations is determined in image processing circuit 4b. Moreover, image processing circuit 4b generates control data so that a control signal of the minimum pulse width (to be referred to as a specific control signal) is generated for the lowermost bit of the additional number of bits in the bit string of gradation data, while control signals of pulse widths corresponding to each bit are generated for the other bits. This control data is input to PWM generation device 4c where control signals are generated corresponding to the control data which are then input to mirror device control circuits 4e and 4f, respectively. Here, PWM generation device 4c controls the timing by which specific control signals are generated in PWM generation circuits 410 and 420 by PWM generation control circuit 400 during generation of control signals. The control of this timing is carried out based on the number of specific control signals generated, and specific control signals are generated in PWM generation circuit 420 at a timing that is delayed, for example, by the delay time calculated using the aforementioned formula (1), beyond the timing by which specific control signals are generated with PWM generation circuit 410. In other words, as shown in FIG. 9B, PWM generation circuit 420 delays the generation starting time of specific control signals corresponding to the control of PWM generation control circuit 400. Thus, specific control signals that have been delayed in PWM generation circuit 420 are input to mirror device drive circuit 4f. Mirror device drive circuits 4e and 4f drive second DMD 70 by delaying for a predetermined amount of time beyond the timing at which first DMD 50 is driven in accordance with the specific control signal of the aforementioned additional bits. In other words, as a result of delaying the driving of second DMD 70, light is transmitted to a target location only for the amount of time the light transmission time of first DMD 50 and the light transmission time of second DMD 70 partially overlap. Thus, by adjusting the respective delay times so that light is transmitted to projection lens 100 only for the amount of time corresponding to each bit of the additional bits, the light transmission time can be controlled corresponding to the additional bits. However, it is necessary to make the delay time different for each additional control signal, and shorter than the pulse width of each control signal. In this manner, in addition to being able to perform gradation display of HDR images by time-based control of the reflecting direction of each micromirror of first DMD 50 and second DMD 70 to control the cumulative transmission time of light to projection lens 100, the number of gradations that can be displayed is expanded by delayed control of second DMD 70 as a result of adding specific control signals and delaying the supply of the specific control signals to mirror device drive circuit 4f beyond the timing by which they are supplied to mirror device drive circuit 4e by a predetermined amount of time for each signal.

Furthermore, in the present Variation 2, although a constitution is employed in which first DMD 50 and second DMD 70 are driven by generating control signals directly linked to the driving contents shown in FIG. 4 in the same manner as the aforementioned Variation 1, the present invention is not limited to this, but rather a constitution may be employed in which first DMD 50 and second DMD 70 are driven by control signals that differ from the control signals shown in FIG. 4 corresponding to the driving method of mirror device drive circuits 4e and 4f.

[Variation 3]

Next, an explanation is provided for the case of using reflecting liquid crystal light valves for the optical modulation elements of a projection-type display device.

Figure 10:
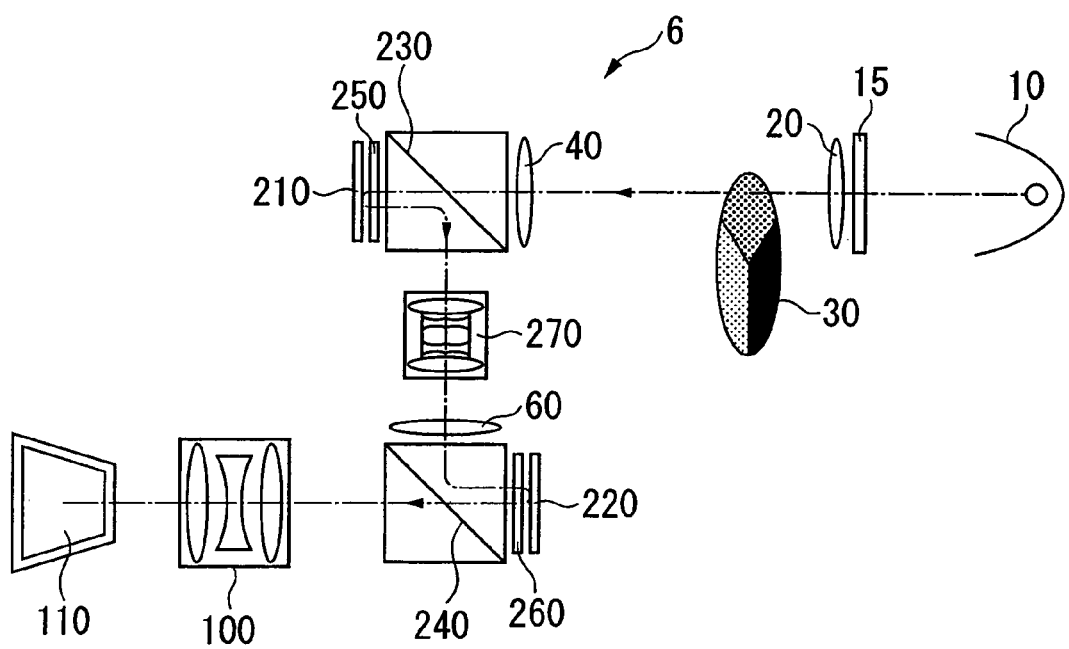
FIG. 10 is a drawing showing the main optical configuration of a projection-type display device 6 as claimed in the present invention.

FIG. 10 shows the main optical configuration of a single-plate projection-type display device 6 that uses reflecting liquid crystal light valves for the first and second optical modulation elements. Furthermore, the same reference symbols as those used in FIG. 1 are used to represent those constituents that are the same as those shown in FIG. 1, and their explanations are omitted.

As shown in FIG. 10, projection-type display device 6 is composed of a light source 10, color filter 30, a first reflecting liquid crystal light valve 210, a second reflecting liquid crystal light valve 220, a first polarizing beam splitter 230, a second polarizing beam splitter 240, a projection lens 100 and a screen 110, and composes these optically arranged in series.

First reflecting liquid crystal light valve 210 and second reflecting liquid crystal light valve 220 are digital drive types of liquid crystal light valves. First polarizing beam splitter 230 and second polarizing beam splitter 240 are optical elements that separate a bundle of light rays into two by a birefringent crystal, and allow P polarized light to pass but reflect S polarized light.

White light irradiated from light source 10 becomes P polarized light as a result of passing through polarizing conversion element 15, and then passes through a converging lens 20, color filter 30 and converging lens 40, after which it is emitted towards first polarizing beam splitter 230.

Since light that has entered first polarizing beam splitter 230 is P polarized light, it passes through (rectilinearly) first polarizing beam splitter 230 and enters first reflecting liquid crystal light valve 210 after going through a λ/4 plate 250. Light that has entered first reflecting liquid crystal light valve 210 is reflected as a result of being subjected to modulation, and then enters first polarizing beam splitter 230 again after going through λ/4 plate 250.

Since light that has reentered first polarizing beam splitter 230 is S polarized light, it is reflected by first polarizing beam splitter 230 causing it to enter a relay lens 270. Relay lens 270 has a telecentric property, and images subjected to modulation in first reflecting liquid crystal light valve 210 are accurately formed on the outgoing side. Light that leaves relay lens 270 passes through a converging lens 60 and is emitted towards second polarizing beam splitter 240.

Since light that has entered second polarizing beam splitter 240 is S polarized light, it is reflected by second polarizing beam splitter 240 and enters second reflecting liquid crystal light valve 220 after going through a λ/4 plate 260. Light that has entered second reflecting liquid crystal light valve 220 is reflected as a result of being subjected to modulation, after which it again enters second polarizing beam splitter 240 after going though λ/4 plate 260. Since the light that has entered is P polarized light, it passes through (rectilinearly) second polarizing beam splitter 240.

P polarized light that has been subjected to modulation with the two reflecting liquid crystal light valves 210 and 220 is projected onto screen 110 through projection lens 100.

As has been described above, since the two reflecting liquid crystal light valves 210 and 220 are driven digitally, normally only luminance decreases while there is no change in contrast. Consequently, the number of gradations can be increased and contrast can be increased considerably by shifting the timing of PWM control signals that drive the two reflecting liquid crystal light valves 210 and 220. Since modulation is performed with two modulation elements for each color, calculation of each pixel is simple.

[Variation 4]

Figure 11:
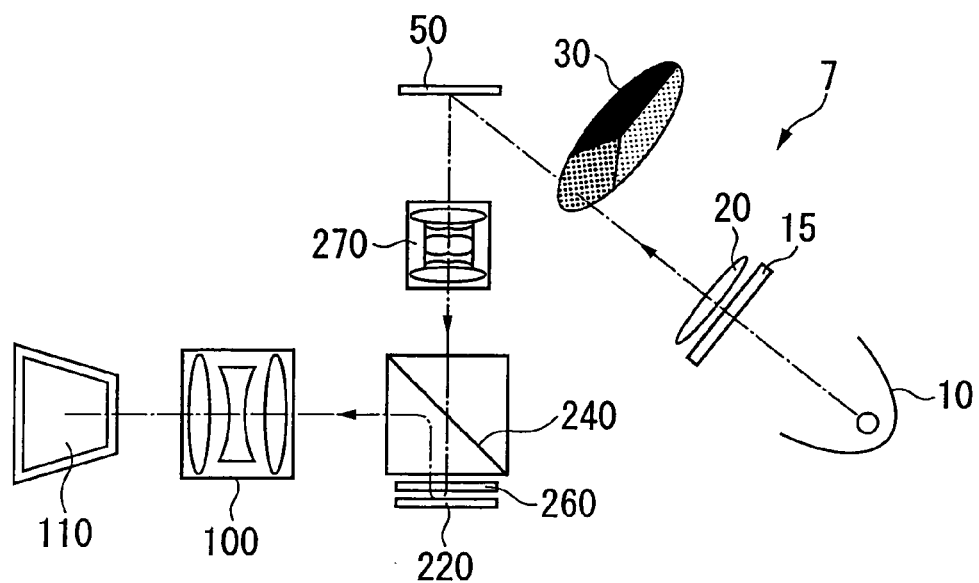
FIG. 11 is a drawing showing the main optical configuration of a projection-type display device 7 as claimed in the present invention.

FIG. 11 shows the main optical configuration of a single-plate projection-type display device 7 that uses a DMD for the first optical modulation element and a reflecting liquid crystal light valve for the second optical modulation element. Furthermore, the same reference symbols as those used in FIGS. 1 and 10 are used to represent those constituents that are the same as those shown in FIGS. 1 and 10, and their explanations are omitted.

As shown in FIG. 11, projection-type display device 7 is composed of a light source 10, color filter 30, a DMD 50, a reflecting liquid crystal light valve 220, a polarizing beam splitter 240, a projection lens 100 and a screen 110, and composes these optically arranged in series.

White light irradiated from light source 10 becomes P polarized light as a result of passing through polarizing conversion element 15, and then passes through a converging lens 20, after which it is emitted towards DMD 50. P polarized light that has been subjected to modulation in DMD 50 then enters a relay lens 270 after which it is emitted towards polarizing beam splitter 240.

Since light that has entered polarizing beam splitter 240 is P polarized light, it passes through (rectilinearly) polarizing beam splitter 240 and enters reflecting liquid crystal light valve 220 after going through a λ/4 plate 250. Light that has entered reflecting liquid crystal light valve 220 is reflected as a result of being subjected to modulation, and then enters polarizing beam splitter 240 again after going through λ/4 plate 260. Since the incident light is S polarized light, it is emitted after being reflected by polarizing beam splitter 240.

S polarized light that has been subjected to modulation with DMD 50 and reflecting liquid crystal light valve 220 is then projected onto screen 110 after passing through projection lens 100.

[Variation 5]

Figure 12:
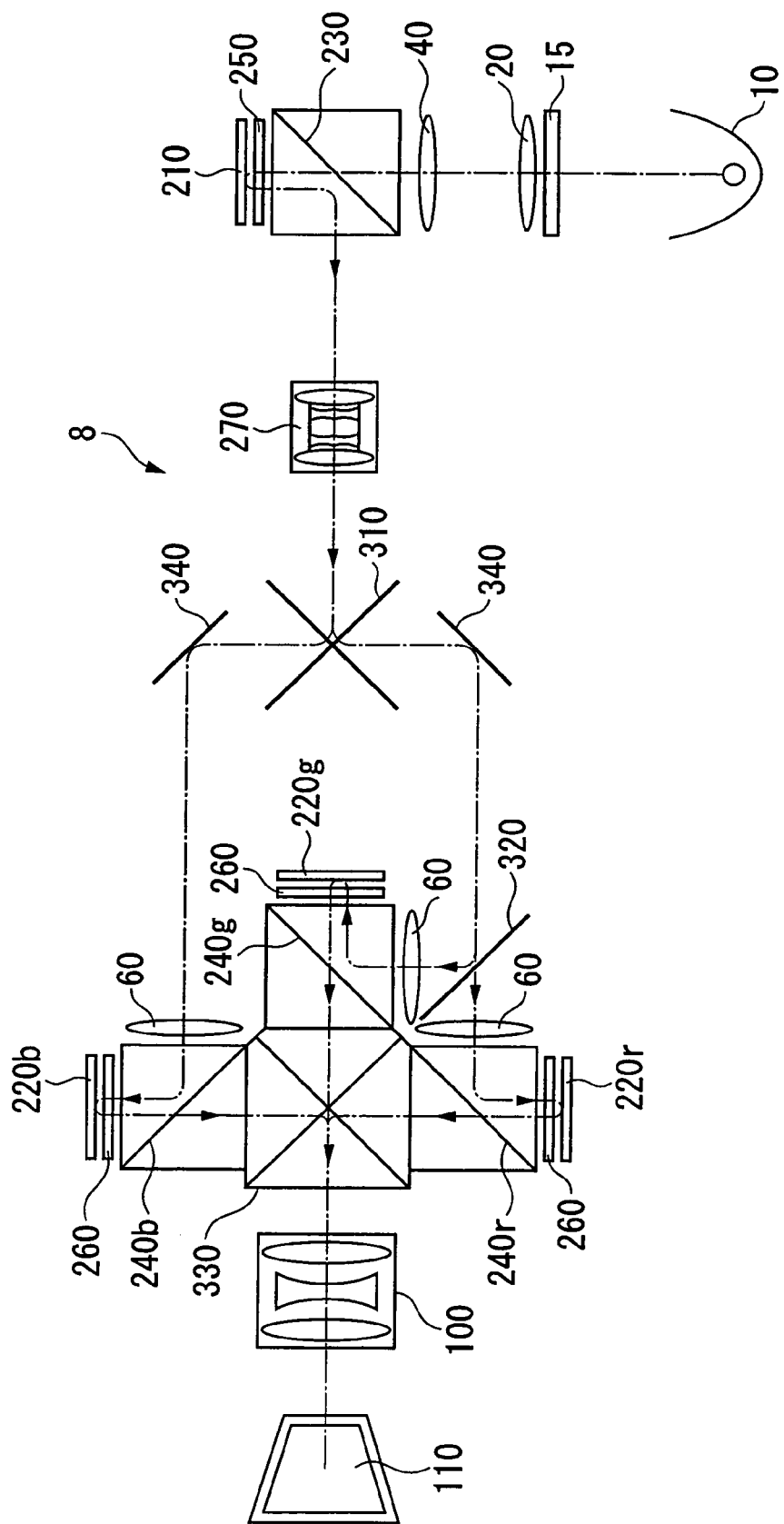
FIG. 12 is a drawing showing the main optical configuration of a projection-type display device 8 as claimed in the present invention.

FIG. 12 shows the main optical configuration of a three-plate projection-type display device 8 that uses reflecting liquid crystal light valves for the first and second optical modulation elements. Furthermore, the same reference symbols as those used in FIGS. 1, 10 and 11 are used to represent those constituents that are the same as those shown in FIGS. 1, 10 and 11, and their explanations are omitted.

As shown in FIG. 12, projection-type display device 8 is composed of a light source 10, a first reflecting liquid crystal light valve 210, second reflecting liquid crystal light valves 220*r*, 220*g* and 220*b*, a first polarizing beam splitter 230, second polarizing beam splitters 240*r*, 240*g* and 240*b*, a first dichroic mirror 310, a second dichroic mirror 320, a color synthesizing prism 330, a projection lens 100 and a screen 110. The light utilization efficiency can be increased as a result of not using a color filter 30.

First dichroic mirror 310 and second dichroic mirror 320 separate light into two or more wavelength regions by using a multilayer film of dielectric substances having respectively different refractive indices. Color synthesizing prism 330 synthesizes red, green and blue light.

White light irradiated from light source 10 becomes P polarized light as a result of passing through polarizing conversion element 15, and then passes through a converging lens 20 and a converging lens 40, after which it is emitted towards first polarizing beam splitter 230.

Since light that has entered first polarizing beam splitter 230 is P polarized light, it passes through (rectilinearly) first polarizing beam splitter 230 and enters first reflecting liquid crystal light valve 210 after going through a λ/4 plate 250. Light that has entered first reflecting liquid crystal light valve 210 is reflected as a result of being subjected to modulation, and then enters first polarizing beam splitter 230 again after going through λ/4 plate 250.

Since light that has reentered first polarizing beam splitter 230 is S polarized light, it is reflected by first polarizing beam splitter 230 causing it to enter a relay lens 270, after which it is emitted towards first dichroic mirror 310.

Light that has entered first dichroic mirror 310 is reflected after being separated into blue light and other colors of light (red and green).

Blue light enters second polarizing beam splitter 240*b*, after being reflected by mirror 340 and subsequently passing through a converging lens 60. Since this light is S polarized light, it is reflected by second polarizing beam splitter 240*b* and enters second reflecting liquid crystal light valve 220*b* after going through λ/4 plate 260. The blue light that has entered second reflecting liquid crystal light valve 220*b* is reflected after being subjected to modulation after which it again enters second polarizing beam splitter 240*b* after going through λ/4 plate 260. Since the incident blue light is P polarized light, it is emitted after passing through second polarizing beam splitter 240*b*.

On the other hand, red and green light enters second dichroic mirror 320 after being reflected by mirror 340 where it is separated into red light and green light and reflected, subsequently passes through a converging lens 60, followed by entering second polarizing beam splitters 240*r* and 240*g*, respectively. Similar to blue light, the red light and green light are modulated in second reflecting liquid crystal light valves 220*r* and 220*g* where they again become P polarized light which is then emitted from second polarizing beam splitters 240*r* and 240*g*.

Each of the P polarized light subjected to modulation in first reflecting liquid crystal light valve 210 and second reflecting liquid crystal light valves 220*r*, 220*g* and 220*b* enters color synthesizing prism 330 where colors are synthesized followed by being projected onto screen 110 after passing through projection lens 100.

[Variation 6]

Figure 13:
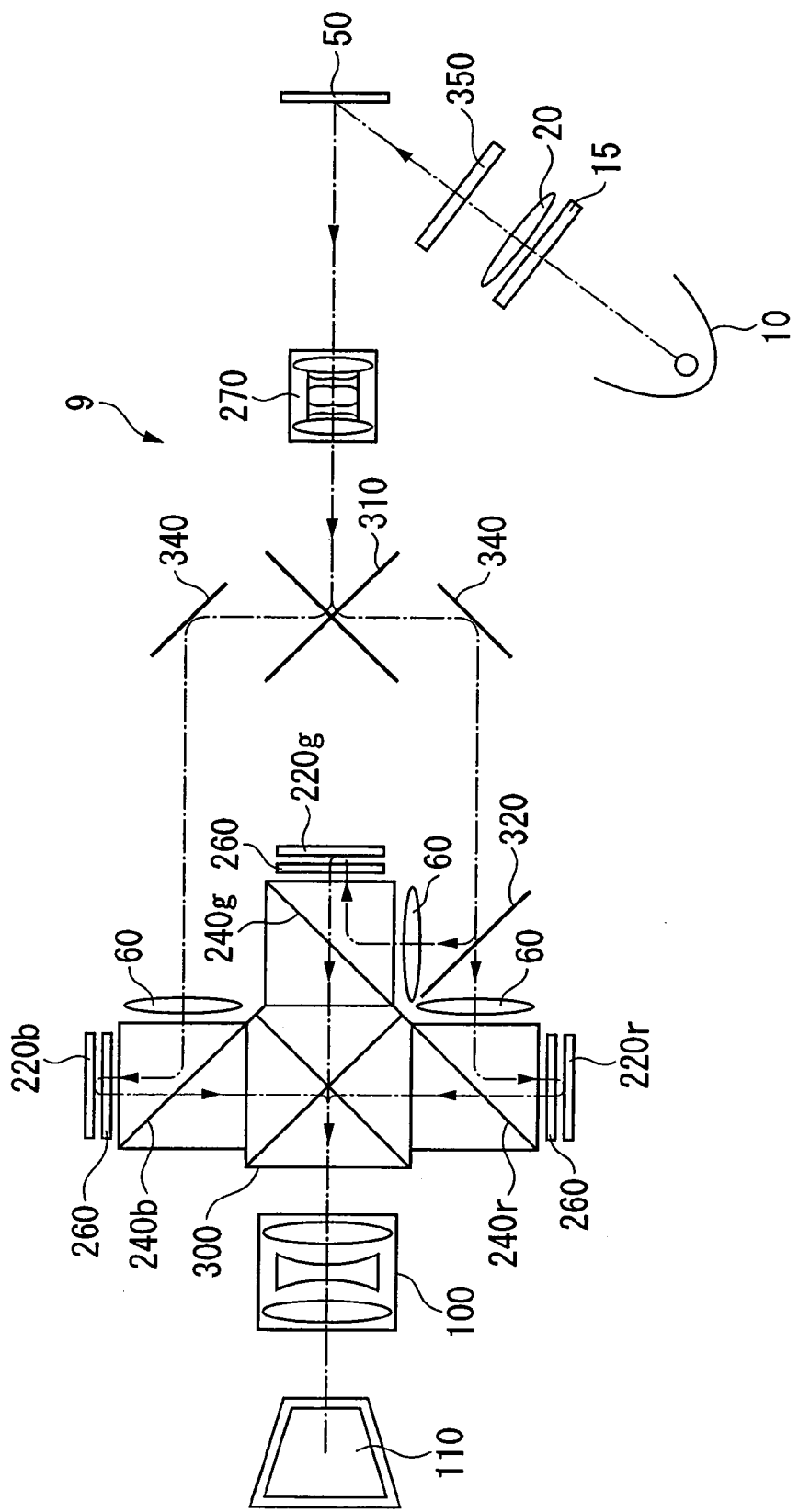
FIG. 13 is a drawing showing the main optical configuration of a projection-type display device 9 as claimed in the present invention.

FIG. 13 shows the main optical configuration of a three-plate projection-type display device 9 that uses a DMD for the first optical modulation element and a reflecting liquid crystal light valve for the second optical modulation element. Furthermore, the same reference symbols as those used in FIGS. 1 and 10 through 12 are used to represent those constituents that are the same as those shown in FIGS. 1 and 10 through 12, and their explanations are omitted.

As shown in FIG. 13, projection-type display device 9 is composed of a light source 10, a DMD 50, reflecting liquid crystal light valves 220r, 220g and 220b, polarizing beam splitters 240r, 240g and 240b, a first dichroic mirror 310, a second dichroic mirror 320, a color synthesizing prism 330, a projection lens 100 and a screen 110. The light utilization efficiency can be increased as a result of not using a color filter 30.

White light irradiated from light source 10 becomes P polarized light as a result of passing through polarizing conversion element 15, and then passes through a converging lens 20 and a converging lens 40, after which it becomes S polarized light by passing through λ/2 plate 350 and is emitted towards DMD 50. The S polarized light subjected to modulation in DMD 50 enters a relay lens 270 and is then emitted towards first dichroic mirror 310.

Light that has entered first dichroic mirror 310 is reflected after being separated into blue light and other colors of light (red and green).

Blue light enters second polarizing beam splitter 240b after being reflected by mirror 340. Since this light is S polarized light, it is reflected by second polarizing beam splitter 240b and enters second reflecting liquid crystal light valve 220b after going through λ/4 plate 260. The blue light that has entered second reflecting liquid crystal light valve 220b is reflected after being subjected to modulation after which it again enters second polarizing beam splitter 240b after going through λ/4 plate 260. Since the incident blue light is P polarized light, it is emitted after passing through second polarizing beam splitter 240b.

On the other hand, red and green light enters second dichroic mirror 320 after being reflected by mirror 340 where it is separated into red light and green light and reflected, subsequently passes through a converging lens 60, followed by entering second polarizing beam splitters 240r and 240g, respectively. Similar to blue light, the red light and green light are modulated in second reflecting liquid crystal light valves 220r and 220g where they again become P polarized light which is then emitted from second polarizing beam splitters 240r and 240g.

Each of the P polarized light subjected to modulation in DMD50 and reflecting liquid crystal light valves 220r, 220g and 220b enters color synthesizing prism 330 where colors are synthesized followed by being projected onto screen 110 after passing through projection lens 100.

In the aforementioned embodiments, first DMD 50 (first reflecting liquid crystal light valve 210) and second DMD 70 (second reflecting liquid crystal light valve 220) correspond to any one of the light transmission elements of Inventions 1, 2, 6, 7, 9, 11 through 14, 18, 19, 23, 24, 28, 29, 33 and 34.

In addition, in the aforementioned embodiments, the generation of waveform data generated by a control program, the generation of control signals by mirror device drive circuits 2b and 3b corresponding to that waveform data, and the synchronous drive control processing of first DMD 50 (first reflecting liquid crystal liquid valve 210) and second DMD 70 (second reflecting liquid crystal light valve 220) correspond to any one of the control signal supply units of Inventions 2, 3, 6, 7, 14, 15 and 18.

In addition, in the aforementioned embodiments, the processing for controlling driving by delayed supply of specific control signals to second DMD 70 (second reflecting liquid crystal light valve 220) according to waveform data generated by a control program and a mirror device 2c corresponding to that waveform data corresponds to any one of the signal delay units of Inventions 1 through 3, 7, 10, 13 through 15, 19 and 22.

In addition, in the aforementioned embodiments, the processing for synchronous drive control of first DMD 50 (first reflecting liquid crystal light valve 210) and second DMD 70 (second reflecting liquid crystal light valve 220) by PWM generation device 3c and mirror device drive circuits 3g and 3h corresponds to any one of the control signal supply units of Inventions 2, 3, 6, 7, 14, 15 and 18.

In addition, in the aforementioned embodiments, the processing for controlling driving by delayed supply of specific control signals to second DMD 70 (second reflecting liquid crystal light valve 220) by PWM generation device 3c, control section 3d, signal delay section 3e and mirror device drive circuits 3g and 3h corresponds to any one of the signal delay units of Inventions 1 through 3, 7, 10, 13 through 15, 19 and 22.

In addition, in the aforementioned embodiments, the processing for synchronous drive control of first DMD 50 (first reflecting liquid crystal light valve 210) and second DMD 70 (second reflecting liquid crystal light valve 220) by PWM generation device 4c and mirror device drive circuits 4e and 4f corresponds to any one of the control signal supply units of Inventions 2, 4, 6, 7, 14, 16 and 18.

In addition, in the aforementioned embodiments, the processing for controlling driving by delayed supply of specific control signals to second DMD 70 (second reflecting liquid crystal light valve 220) by PWM generation device 4c and mirror device drive circuits 4e and 4f corresponds to any one of the signal delay units of Inventions 1, 2, 4, 7, 10, 13, 14, 16, 19 and 22.

Furthermore, in the aforementioned embodiments, although a DMD or reflecting liquid crystal light valve is used as an optical modulation element, the present invention is not limited to this, but rather an optical modulation element such as a transmitting liquid crystal light valve can also be used.

In addition, in the aforementioned embodiments, although a judgment is made by a program or hardware as to whether or not an input HDR image is equal to or greater than a predetermined number of gradations, a constitution may also be employed in which a judgment section is not provided by performing fixed processing according to a predetermined number of gradations.

In addition, although the aforementioned embodiments are explained for the case of executing a control program preliminarily stored in ROM 2e for the execution of processing indicated in the flow chart of FIG. 5, the present invention is not limited to this, but rather a program that indicates these procedure may be executed by loading the program into RAM 2f from a storage medium in which program is stored.

Furthermore, a storage medium refers to a semiconductor storage medium such as RAM or ROM, a magnetic storage type of storage medium such as an FD or HD, an optical scanning type of storage medium such as a CD, CDV, LD or DVD, or a magnetic storage type/optical scanning type of storage medium such as an MO, and includes all such types of storage media provided it is a storage medium that can be read with a computer regardless of whether the reading method is electronic, magnetic or optical.

What is claimed is:

1. A graduation control device applied to an optical system comprising:
    two or more optical transmission elements optically arranged in series having a plurality of optical transmission sections capable of independently controlling a transmission state and non-transmission state of incident light in a predetermined direction, and the transmission state and non-transmission state of the two or more optical transmission elements being controlled by a control signal corresponding to each bit of a bit string that indicates a number of gradations; and a signal delay unit that delays the timing by which the control signal is supplied to another optical transmission element by a predetermined amount of time beyond the timing by which the control signal is supplied to any one of the two or more optical transmission elements, and controls a transmission time of light to a target location by utilizing a time difference of the control signal that is supplied to the two or more optical transmission elements, whereby a number of gradations that are displayed can be expanded beyond a number of gradations that could be displayed by synchronous control of the two or more optical transmission elements.

2. An optical display device comprising:

two or more optical transmission elements optically arranged in series having a plurality of optical transmission sections capable of independently controlling a transmission state and non-transmission state of incident light in a specific direction;

a control signal supply unit that generates a control signal that corresponds to each bit of a bit string that indicates a number of gradations and controls the transmission state and non-transmission state of the optical transmission elements based on the number of gradations of the displayed image, and supplies the generated control signal at a timing that is synchronized to each of the two or more optical transmission elements and a signal delay unit that delays the timing by which the control signal is supplied to another optical transmission element by a predetermined amount of time beyond the timing by which the control signal is supplied to any one of the two or more optical transmission elements, and controls a transmission time of light to a target location by utilizing a time difference of the control signal that is supplied to the two or more optical transmission elements, whereby a number of gradations that are displayed can be expanded beyond a number of gradations that could be displayed by synchronous control of the two or more optical transmission elements.

3. An optical display device according to claim 2, wherein the control signal supply unit generates a plurality of control signals based on the number of gradations of the displayed image, and the signal delay unit delays any one of the plurality of control signals by a predetermined amount of time based on the number of gradations.

4. An optical display device according to claim 2, wherein the control signal supply unit generates a plurality of control signals based on the number of gradations of the displayed image, and the signal delay unit delays the timing by which any of the plurality of control signals is generated by a predetermined amount of time based on the number of gradations.

5. An optical display device according to claim 2, wherein the duration of the transmission state is controlled according to the pulse width of the control signal.

6. An optical display device according to claim 2, wherein the control signal supply unit is able to generate a pulse width control signal corresponding to each bit of a bit string that indicates the number of gradations based on the number of gradations of the displayed image, and is able to supply the generated control signal based on time-sharing and at a timing that is synchronized to each of the two or more optical transmission elements.

7. An optical display device according to claim 2, wherein the control signal supply unit generates a control signal having a specific pulse width corresponding to a specific bit of the bit string that indicates the number of gradations; and the signal delay unit calculates the delay time for the control signal having the specific pulse width based on the specific bit, and delays the timing by which the control signal having the specific pulse width is supplied to another optical transmission element beyond the timing by which the control signal having the specific pulse width is supplied to any one of the two or more optical transmission elements based on the calculated delay time.

8. An optical display device according to claim 7, wherein the specific pulse width is equal to the pulse width of a control signal corresponding to the lowermost bit excluding the specific bit of the bit string that indicates the number of gradations.

9. An optical display device according to claim 7, wherein a supply interval of the specific pulse width is larger than the specific pulse width.

10. An optical display device according to claim 7, wherein in the case the number of specific bits is represented with n (where n is an integer), and the bit location of the specific bit in the bit string that indicates the number of gradations of the displayed image is represented with m (where m is an integer from 0 to (n−1)), then the signal delay unit calculates the amount of time obtained by multiplying the time of the specific pulse width by a coefficient obtained according to $(2^n - 2^m)/2^n$ as the delay time of the specific pulse width control signal.

11. An optical display device according to claim 2, wherein the number of optical transmission sections in the two or more optical transmission elements is the same for each optical transmission element.

12. An optical display device according to claim 2, wherein the two or more optical transmission elements are reflecting optical transmission elements.

13. An optical display device according to claim 2, wherein the two or more optical transmission elements are digital micromirror devices.

14. An optical display device according to claim 2, wherein the two or more optical transmission elements are reflecting liquid crystal light valves.

15. An optical display device according to claim 2, wherein the two or more optical transmission elements are transmitting liquid crystal light valves.

16. An optical display device according to claim 2, wherein each of the two or more optical transmission elements can be one of a digital micromirror device, a reflecting liquid crystal light valve, and a transmitting liquid crystal light valve.

17. A method of controlling gradation applied to an optical system having two or more optical transmission elements optically arranged in series that have a plurality of optical transmission sections capable of independently controlling a transmission state and non-transmission state of incident light in a specific direction, comprising:

controlling synchronously the transmission state and non-transmission state of the two or more optical transmission elements with a control signal corresponding to each bit of a bit string that indicates a number of gradations based on the number of gradations of the displayed image;

delaying the timing by which the control signal is supplied to another optical transmission element by a predetermined amount of time beyond the timing by which the control signal is supplied to any one of the two or more optical transmission elements; and controlling a transmission time of light to a target location by utilizing a time difference of the control signal that is supplied to the two or more optical transmission elements, whereby a number of gradations that are displayed can be expanded beyond a number of gradations that could be displayed by synchronous control of the two or more optical transmission elements.

18. A method of controlling an optical display device having two or more optical transmission elements optically arranged in series that have a plurality of optical transmission sections capable of independently controlling a transmission state and non-transmission state of incident light in a specific direction, and controlling the transmission state and non-transmission state of the light from a light source by means of the two or more optical transmission elements; comprising:

generating a control signal that corresponds to each bit of a bit string that indicates a number of gradations and controls the transmission state and non-transmission state of the optical transmission elements based on the number of gradations of a displayed image;

supplying the generated control signal at a timing that is synchronized to each of the two or more optical transmission elements;

delaying the timing by which the control signal is supplied to another optical transmission element by a predetermined amount of time beyond the timing by which the control signal is supplied to any one of the two or more optical transmission elements; and controlling a transmission time of light to a target location by utilizing a time difference of the control signal that is supplied to the two or more optical transmission elements, whereby a number of gradations that are displayed can be expanded beyond a number of gradations that could be displayed by synchronous control of the two or more optical transmission elements.

* * * * *